US008406504B2

(12) United States Patent
Hasegawa et al.

(10) Patent No.: US 8,406,504 B2
(45) Date of Patent: Mar. 26, 2013

(54) SYSTEM AND METHOD FOR MONITORING OF WELDING STATE

(75) Inventors: Noboru Hasegawa, Tokyo (JP); Hideki Hamatani, Tokyo (JP); Michimasa Mukai, Tokyo (JP); Kazuto Yamamoto, Tokyo (JP); Takashi Miyakawa, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 465 days.

(21) Appl. No.: 12/734,413

(22) PCT Filed: Oct. 31, 2008

(86) PCT No.: PCT/JP2008/070361
§ 371 (c)(1),
(2), (4) Date: Apr. 28, 2010

(87) PCT Pub. No.: WO2009/057830
PCT Pub. Date: May 7, 2009

(65) Prior Publication Data
US 2010/0232678 A1    Sep. 16, 2010

(30) Foreign Application Priority Data

Nov. 2, 2007  (JP) ................................. 2007-286646
Jan. 24, 2008 (JP) ................................. 2008-014212

(51) Int. Cl.
*G06K 9/00* (2006.01)

(52) U.S. Cl. ..................................................... 382/152
(58) Field of Classification Search ............. 382/3, 141, 382/152; 356/601, 610
See application file for complete search history.

(56) References Cited

U.S. PATENT DOCUMENTS 5,223,683 A       6/1993  Ishizaka
2005/0147289 A1 *  7/2005  Kodama et al. ............... 382/152

FOREIGN PATENT DOCUMENTS

| JP | 62-203680 | 9/1987 |
| JP | 5-23870   | 2/1993 |
| JP | 05-123874 | 5/1993 |
| JP | 5-318141  | 12/1993 |
| JP | 7-120406  | 5/1995 |

(Continued)

OTHER PUBLICATIONS

Korean Office Action dated Dec. 7, 2011, issued in corresponding Korean Application No. 10-2010-7009537.

(Continued)

*Primary Examiner* — Tarifur Chowdhury
*Assistant Examiner* — Abdullahi Nur
(74) *Attorney, Agent, or Firm* — Kenyon & Kenyon LLP

(57) ABSTRACT

The invention provides a system and method for monitoring the molten state of electric-resistance-welded pipe on-line. In the system, a mirror provided at a front end side inside a container receives light emitted by the welded parts of the tube-shaped steel strip through heat resistant glass from the side direction and reflects the image in the direction of a relay lens provided at a base end side of a relay lens unit. The relay lenses relay the image to a conversion lens, which forms the image on the imaging area of a CCD camera. Therefore, it is possible to capture the welded parts from the side direction by a resolution in accordance with the resolution of the CCD camera and possible to obtain information of the welded parts more accurately than in the past and on-line.

30 Claims, 25 Drawing Sheets

FOREIGN PATENT DOCUMENTS

| | | |
|---|---|---|
| JP | 10-34354 | 2/1998 |
| JP | 11-156434 | 6/1999 |
| JP | 2001-292353 | 10/2001 |
| JP | 2008-238187 | 10/2008 |

OTHER PUBLICATIONS

International Search Report dated Feb. 17, 2009 issued in corresponding PCT Application No. PCT/JP2008/070361.

* cited by examiner

Fig.1
(a)
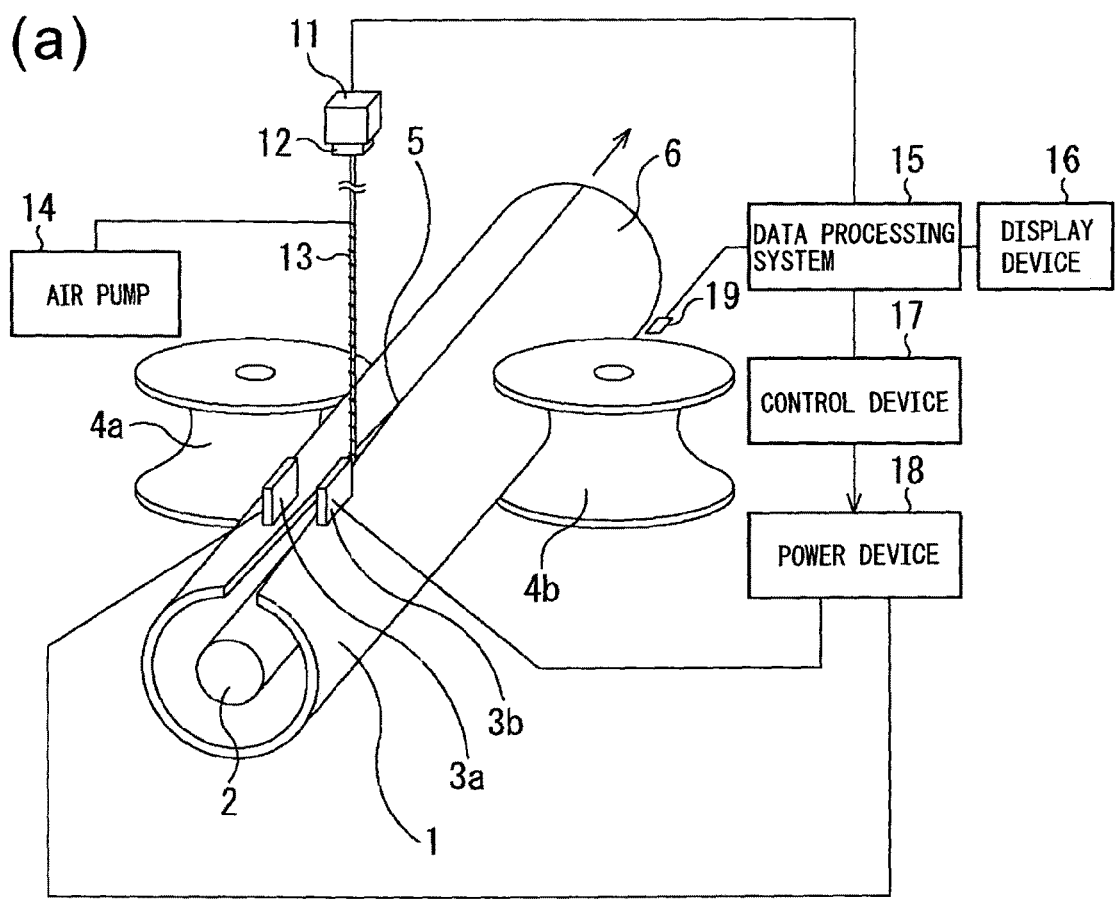
(b)
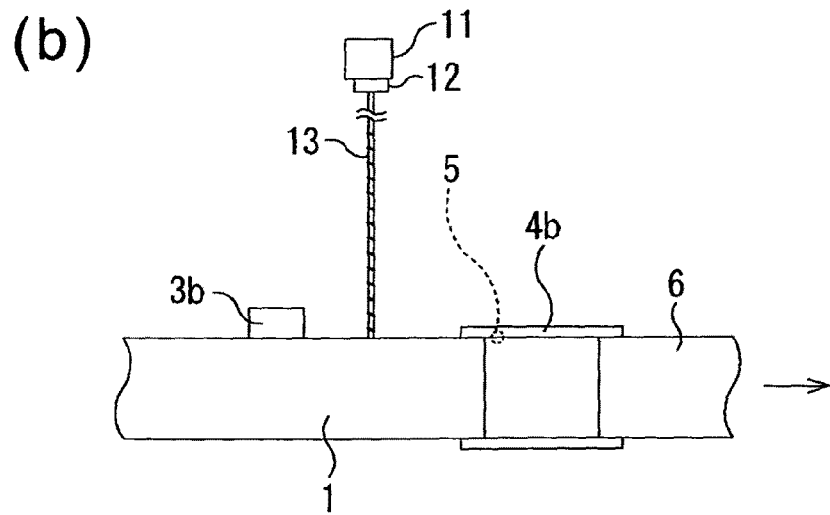

Fig.2
(a)
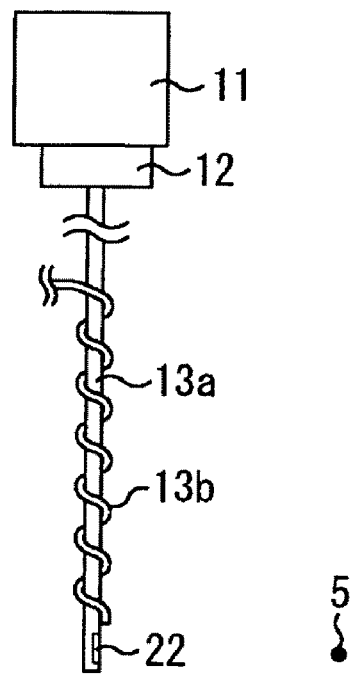
(b)
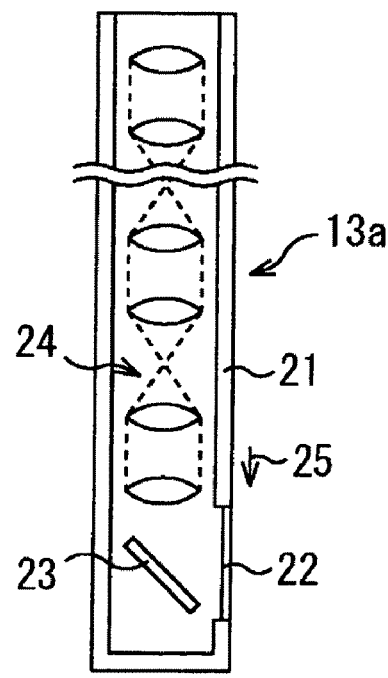

Fig.5
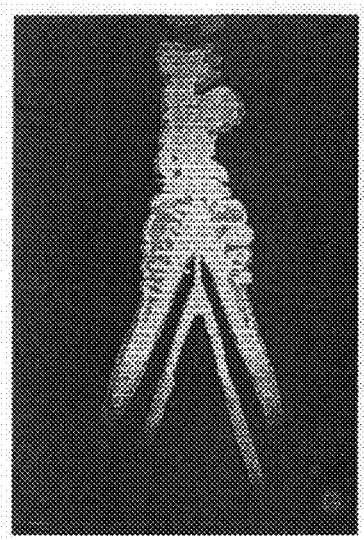
(a)
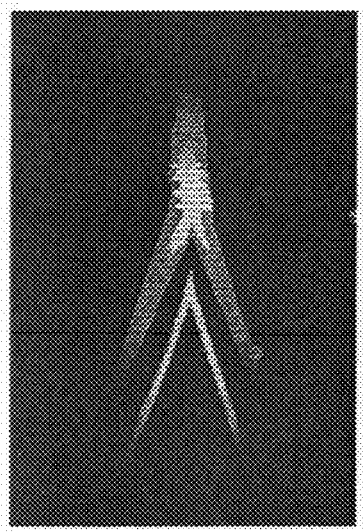
(b)
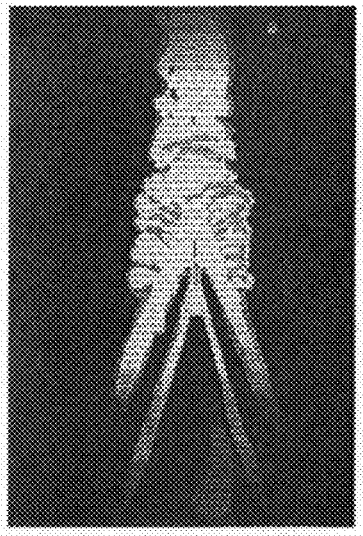
(c)

Fig.6
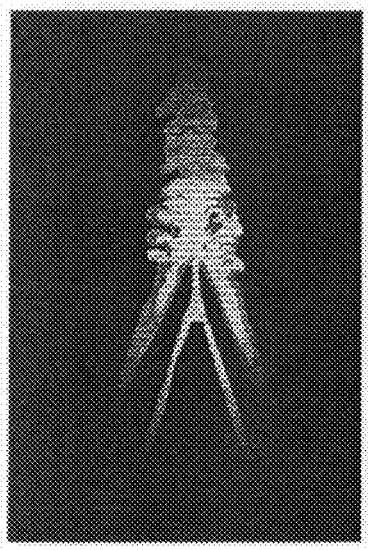
(a)
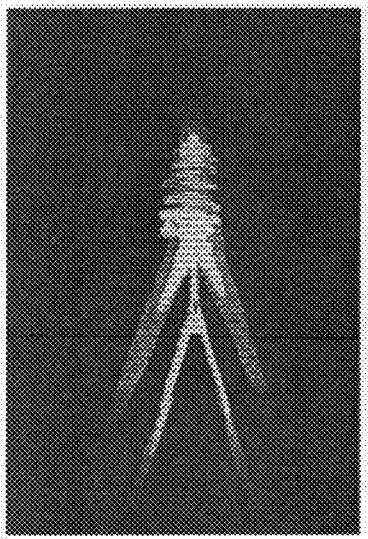
(b)
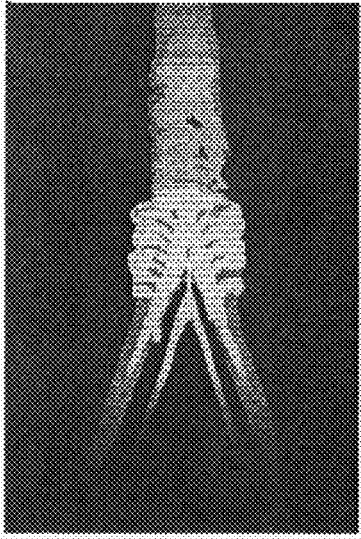
(c)

Fig.7
(a)
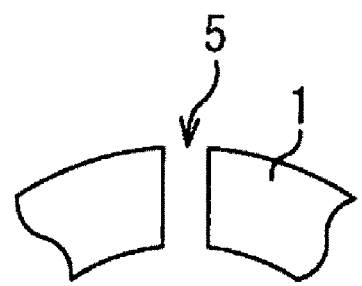
(b)
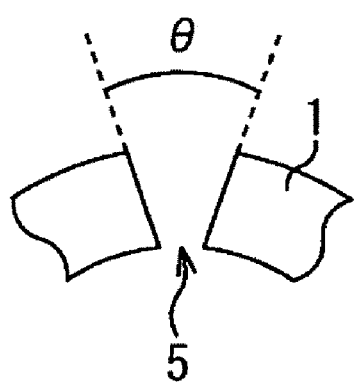
(c)
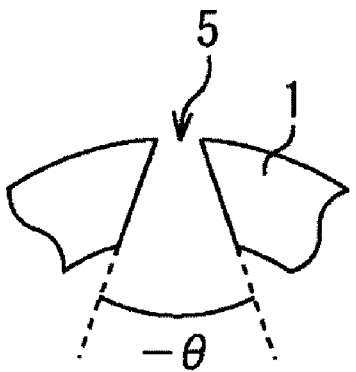

Fig. 13
(a)
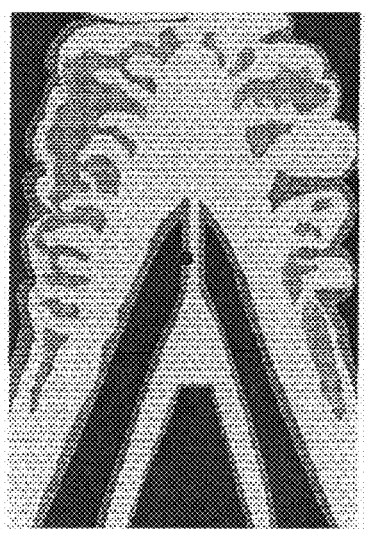
(b)
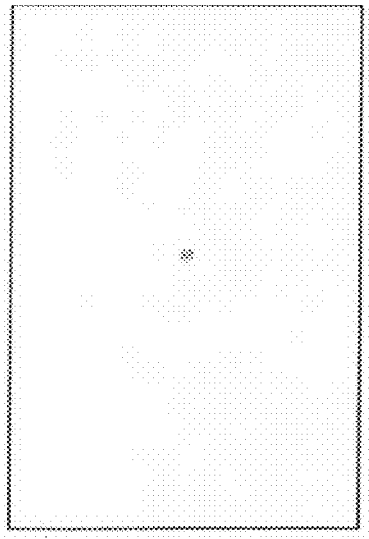
(c)

Fig. 16
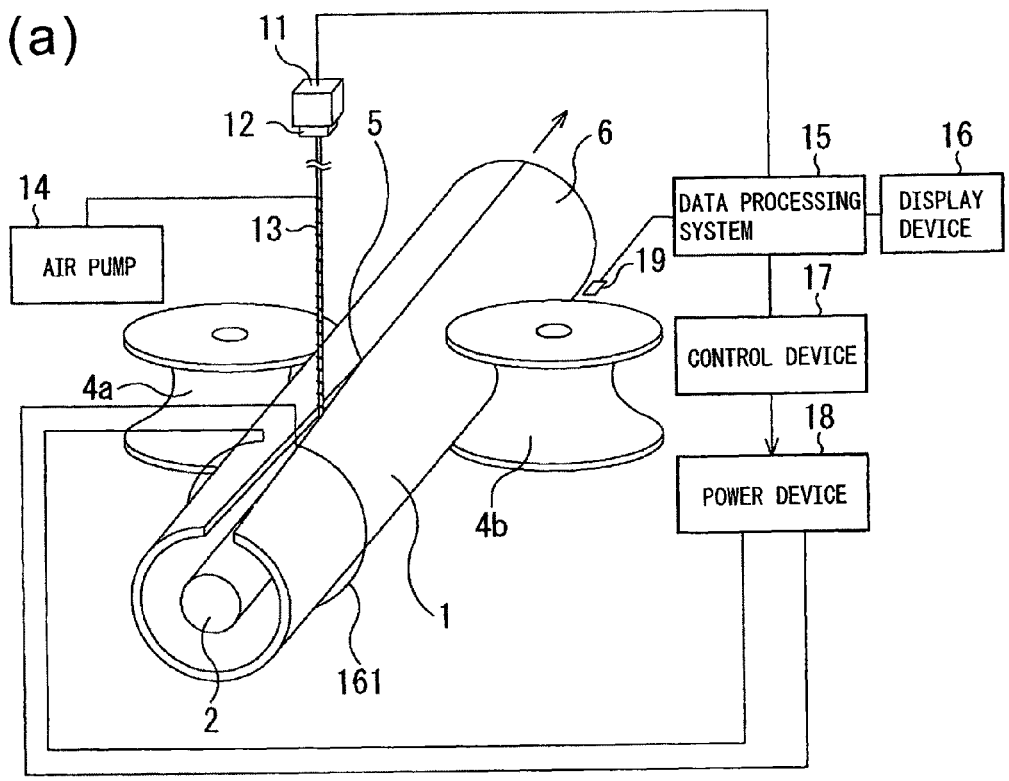
(a)
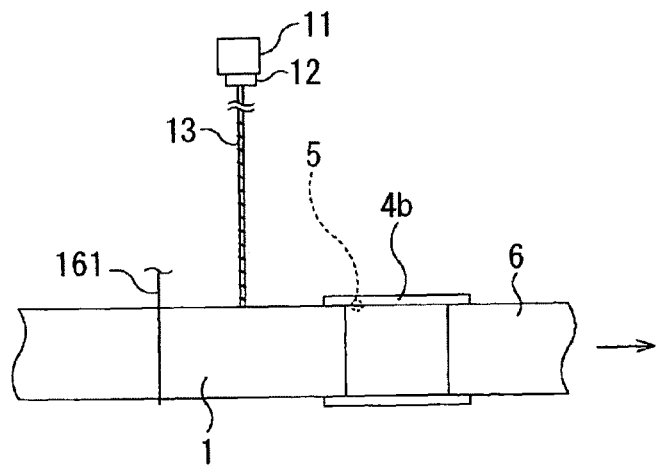
(b)

Fig.19
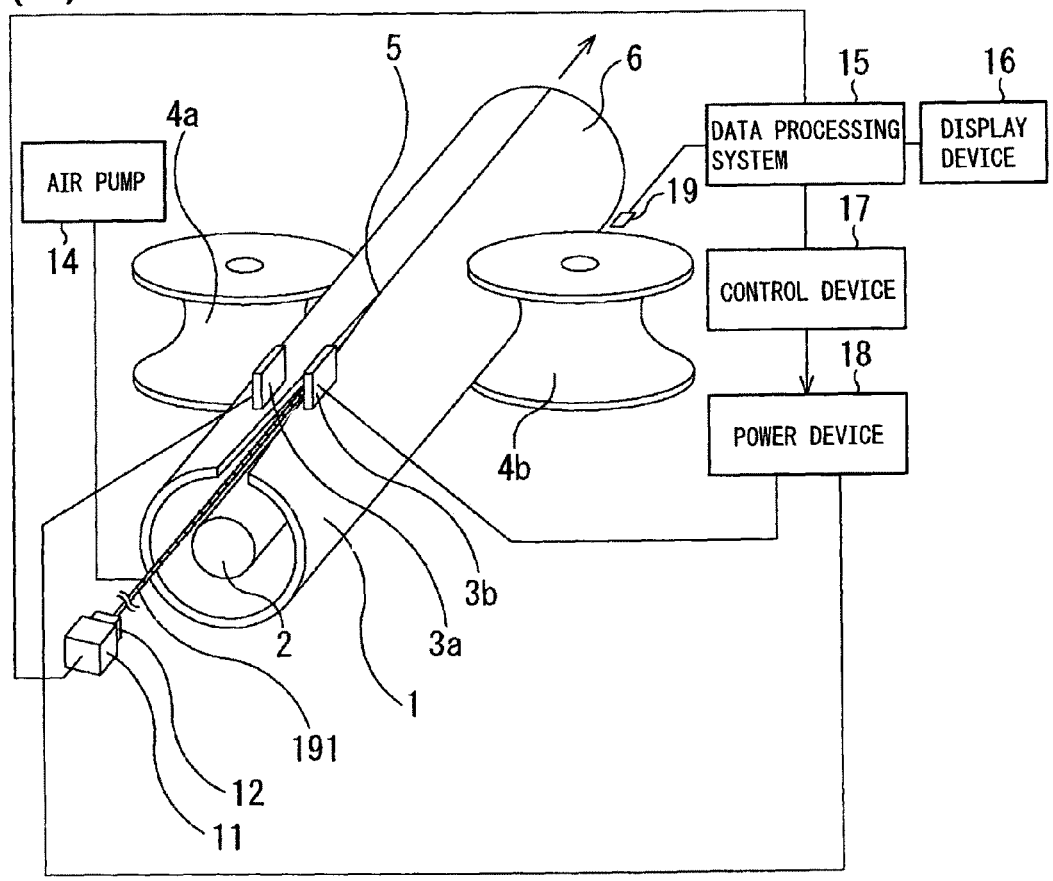
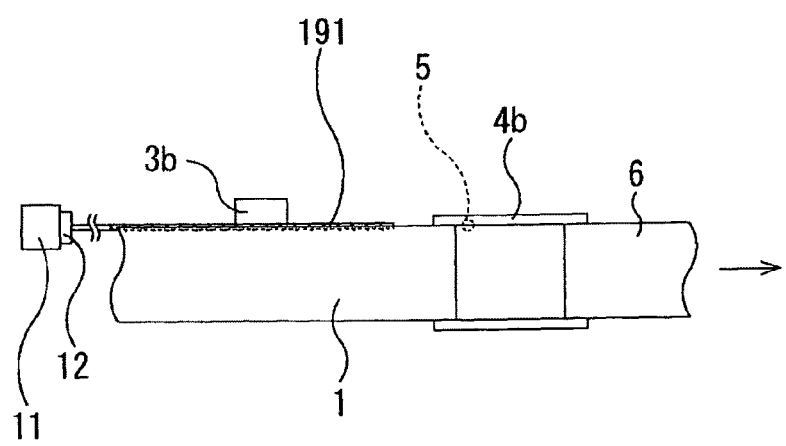

Fig.21
(a)
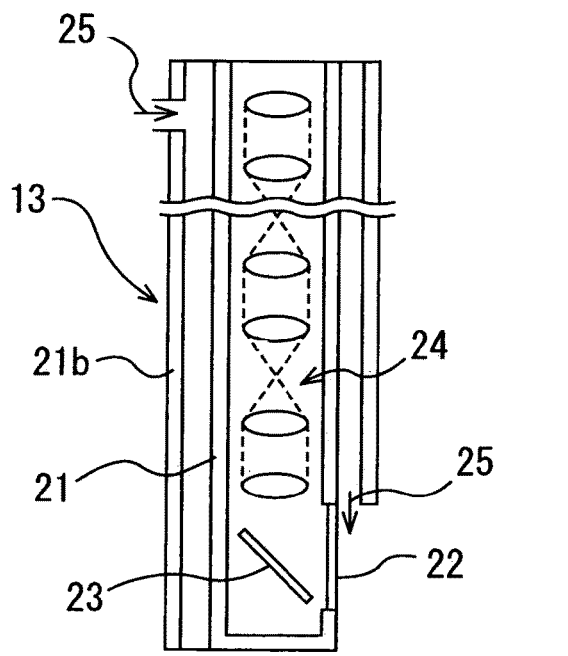
(b)
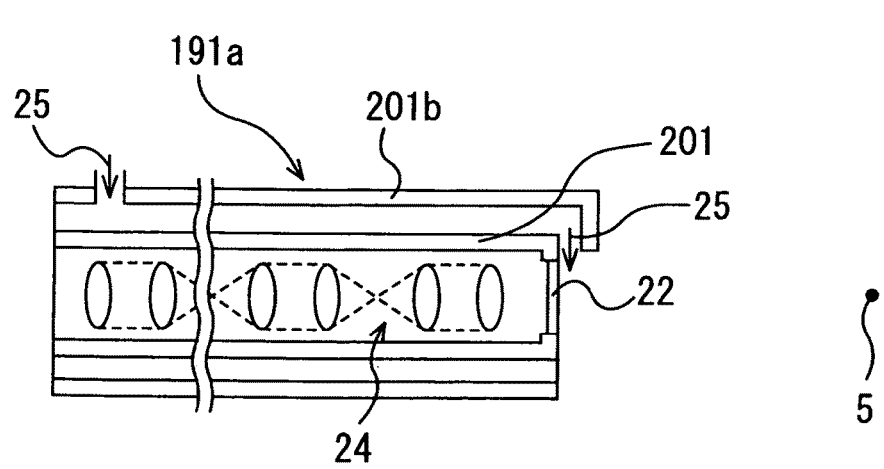

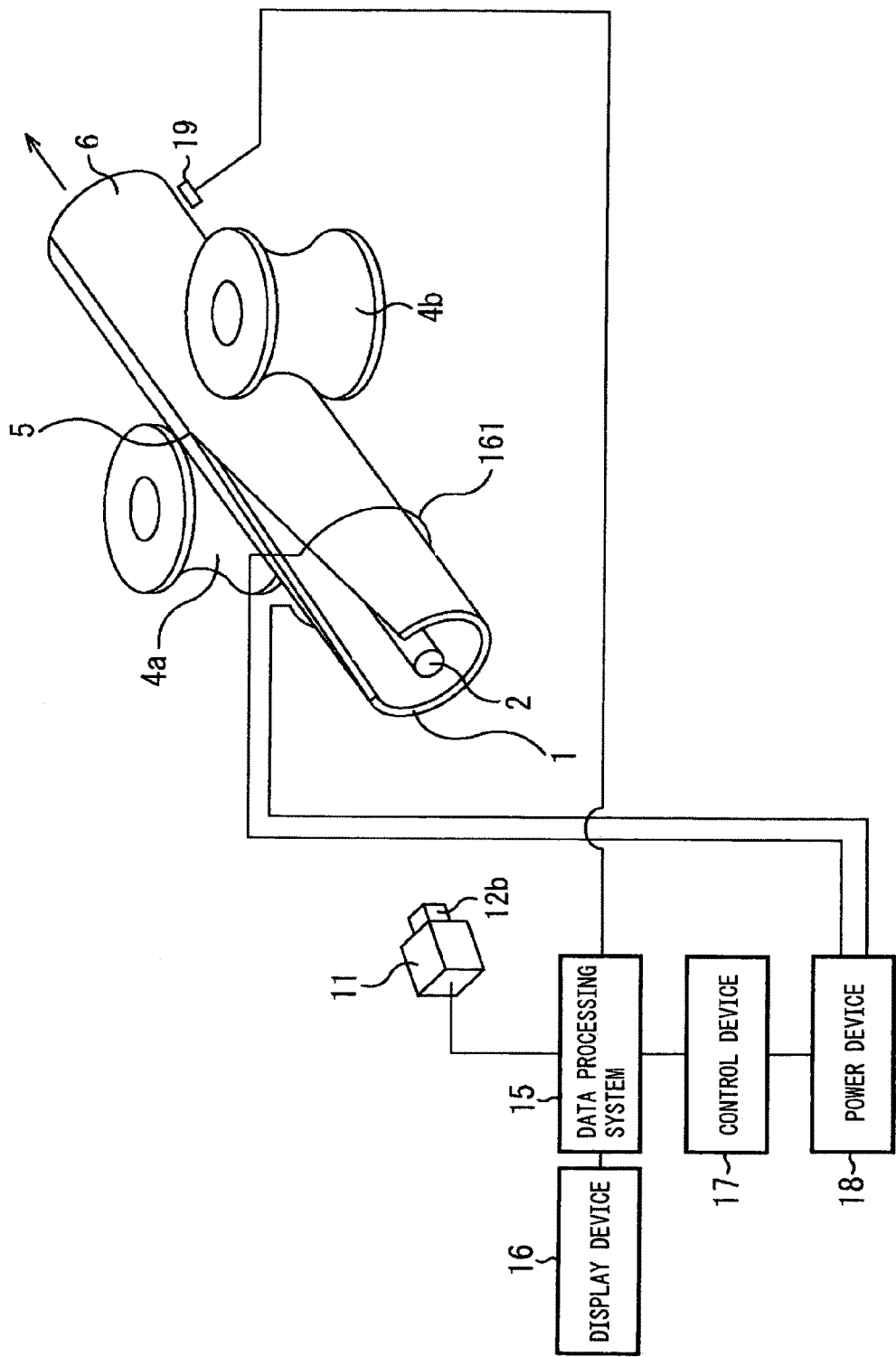

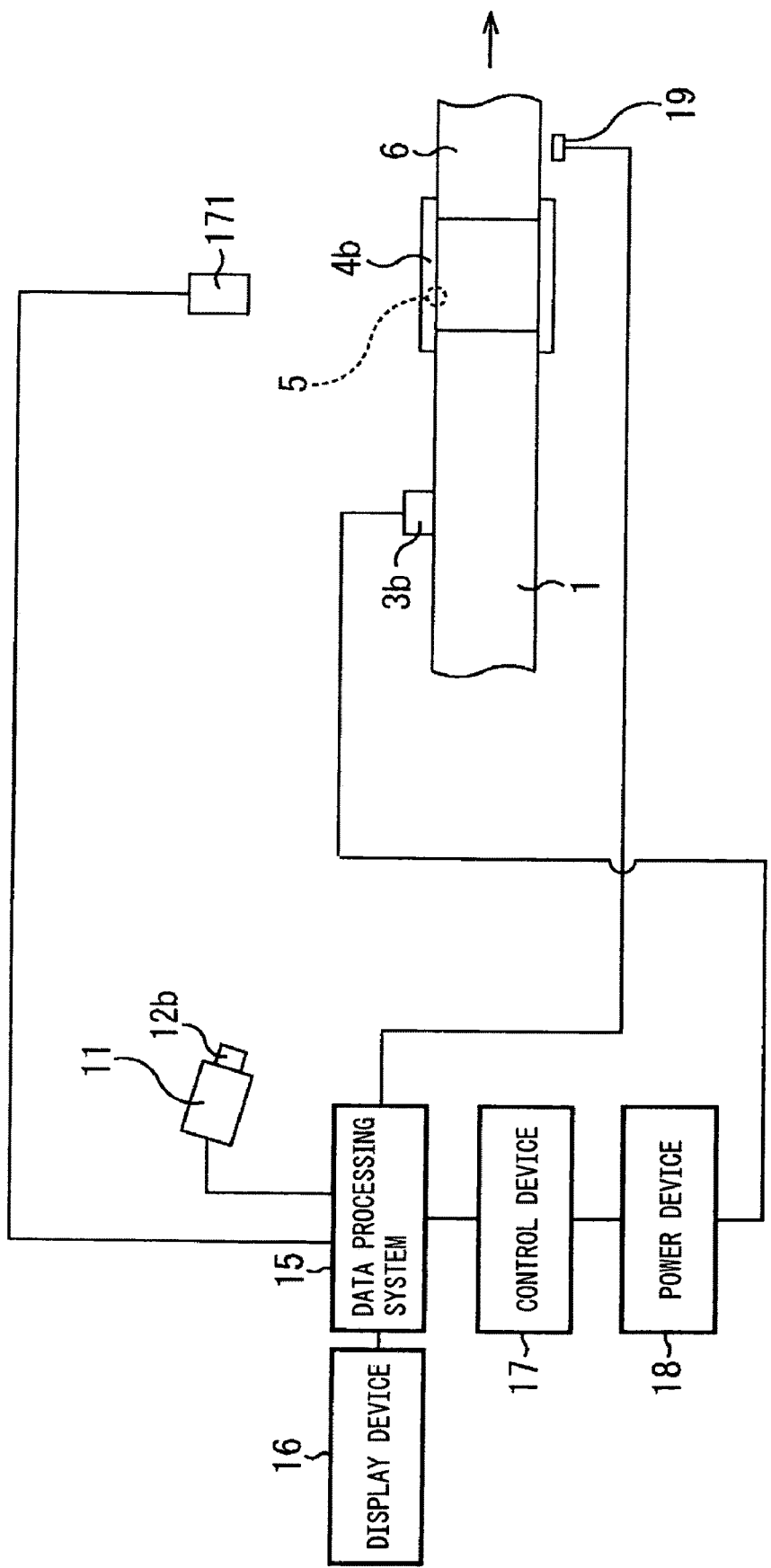

SYSTEM AND METHOD FOR MONITORING OF WELDING STATE

This application is a national stage application of International Application No. PCT/JP2008/070361, filed 31 Oct. 2008, which claims priority to Japanese Application Nos. 2007-286646, filed 02 Nov. 2007; and 2008-014212, filed 24 Jan. 2008, each of which is incorporated by reference in its entirety.

TECHNICAL FIELD

The present invention relates to a system for monitoring the state of production of electric-resistance-welded pipe and a method for monitoring the state of production of electric-resistance-welded pipe, particularly is suitable for use for monitoring the state of electric-resistance-welded pipe on-line.

BACKGROUND ART

When producing electric-resistance-welded pipe, first the two ends of a strip-shaped steel plate are forced together by using a plurality of rolls to thereby shape the strip-shaped steel plate into a tube. Further, an induction coil or electrode contact tips arranged substantially coaxially with the tube shaped strip-shaped steel plate are used to run a high frequency current to the two ends of the tube shaped strip-shaped steel plate (weld faces). The Joule's heat generated at the two ends of the strip-shaped steel plate due to this high frequency current heats the weld faces to melt. Further, the heated and melted parts are pressed by squeeze rolls to join them.

When producing electric-resistance-welded pipe in this way, the weld faces start to melt from the edge parts. Therefore, the molten state at the center part of the weld faces becomes a problem. That is, if the center part of the weld faces does not melt, even if the squeeze rolls apply pressure, the weld faces will not be joined or the strength of the electric-resistance-welded pipe produced will be insufficient. On the other hand, if the center part of the weld faces overly melts, scale (oxides) which had been pushed out from the weld faces will be pulled into the weld faces by electromagnetic force. This scale will cause defects.

Therefore, it is extremely important to accurately monitor the welding state of electric-resistance-welded pipe in an electric-resistance-welded pipe production line.

Therefore, Japanese Patent Publication (A) No. 5-123874 discloses to use a camera placed directly above a weld point of electric-resistance-welded pipe being produced so as to take a still image of the surroundings of the weld point, convert the still image to a digital image, and perform image processing to find the position of the weld point.

Further, Japanese Patent Publication (A) No. 62-203680 discloses to run a fiber scope through the inside of electric-resistance-welded pipe being produced and process the image of the welded parts obtained by this fiber scope to estimate the butting state of the electric-resistance-welded pipe.

DISCLOSURE OF THE INVENTION

However, in the technology of Japanese Patent Publication (A) No. 5-123874, the image of the surroundings of the weld point is taken from directly above the weld point of the electric-resistance-welded pipe being produced, so for example if the butting state seen from the axial direction of the electric-resistance-welded pipe is an inverted V-shape and the state is a state of low input heat (state where the weld faces are not sufficiently melted), this is liable to end up being judged as a suitable state. Therefore, there was the problem that it was extremely difficult to obtain a grasp of the heat input state (molten state), including the butting state, of the weld faces.

Further, in the technology described in Japanese Patent Publication (A) No. 62-203680, a fiber scope was used to obtain an image, so it was not possible to obtain an image with a sufficient resolution for obtaining a grasp of the state of the weld faces. Further, images of parts (clearance) between the fibers forming the fiber scope cannot be obtained, so the image as a whole becomes a mesh state. Therefore, there was the problem that it was extremely difficult to obtain an accurate grasp of the state of the weld faces.

The present invention was made in consideration of the above points and is designed to enable the molten state of steel plate at the welded parts, the butting state of steel plate, and other welding states of electric-resistance-welded pipe to be monitored on-line more accurately than in the past.

The means for solving the problems of the present invention are as follows:

The system for monitoring the state of production of electric-resistance-welded pipe of the present invention is a system for monitoring the state of production of electric-resistance-welded pipe which monitors the state of welded parts on-line when heating and welding the two ends of steel plate formed into a tube shape for producing electric-resistance-welded pipe, which, as a specific aspect, has relay lenses relaying an image based on light emitted from said welded parts, a container containing said relay lenses and made at least in part by an insulated material, an imaging means for obtaining an image relayed by said relay lenses or a lens for enabling an enlarged image of said welded parts to be obtained and an imaging means for obtaining an image based on light passing through said lens from an upstream side of the production line, an analyzing means for analyzing a state of the steel plate at said welded parts in a plate thickness direction based on image data obtained by these imaging means, and a displaying means for displaying results of analysis by said analyzing means on a display device and which collects and processes information of the welded parts in the plate thickness direction. Further, the invention has as its gist the following:

(1) A system for monitoring a state of production of electric-resistance-welded pipe which monitors a state of welded parts on-line when forming steel plate into a tube shape and welding two ends of the steel plate to produce electric-resistance-welded pipe, said system for monitoring a state of production of electric-resistance-welded pipe characterized by having an imaging means for obtaining an image from light emitted from butting surfaces of said steel plate at said welded parts from an upstream side of said welding process, an analyzing means for analyzing a state of the steel plate at said welded parts in a plate thickness direction based on image data obtained by said imaging means, and a displaying means for displaying results of analysis by said analyzing means on a display device.

(2) A system for monitoring a state of production of electric-resistance-welded pipe as set forth in (1) characterized in that said imaging means has relay lenses for relaying an image based on light emitted from said welded parts, a container containing said relay lenses and made at least in part by an insulated material, and an imaging device obtaining the image relayed by said relay lenses and converting it to image data.

(3) A system for monitoring a state of production of electric-resistance-welded pipe as set forth in (2) characterized by having inside said container a mirror reflecting the image based on the light emitted from said welded parts and relaying the image reflected by said mirror by said relay lenses.

(4) A system for monitoring a state of production of electric-resistance-welded pipe as set forth in (2) or (3) characterized by having in said container a transparent material allowing the light emitted from said welded parts to pass to the inside of said container.

(5) A system for monitoring a state of production of electric-resistance-welded pipe as set forth in any one of (2) to (4) characterized by attaching to the surface of said container a pipe made from an insulated material and having a supplying means for supplying a gas or liquid inside said pipe.

(6) A system for monitoring a state of production of electric-resistance-welded pipe as set forth in (5) characterized in that the gas or liquid supplied inside said pipe is discharged over said transparent material.

(7) A system for monitoring a state of production of electric-resistance-welded pipe as set forth in any one of (2) to (4) characterized by having at the outside of said container a second container arranged parallel to said container across a space and made of an insulated material and having a supplying means for supplying a gas or liquid between said container and said second container.

(8) A system for monitoring a state of production of electric-resistance-welded pipe as set forth in (7) characterized in that the gas or liquid supplied inside said second container is discharged over said transparent material.

(9) A system for monitoring a state of production of electric-resistance-welded pipe as set forth in (1) characterized in that said imaging means has a lens for enabling an image based on light emitted from said welded parts to be obtained enlarged and an imaging device obtaining said image from an upstream side of the production line and converting it to image data.

(10) A system for monitoring a state of production of electric-resistance-welded pipe as set forth in (9) characterized in that said lens is provided at a position enabling it to receive light emitted from different positions of the butting surfaces of said welded parts in the plate thickness direction and enabling said lens to be focused at said welded parts.

(11) A system for monitoring a state of production of electric-resistance-welded pipe as set forth in (10) characterized in that said lens is provided at a position wherein an elevation angle when viewing an optical axis direction of said lens from a certain part of said welded parts is minus 20° to 20°.

(12) A system for monitoring a state of production of electric-resistance-welded pipe as set forth in any one of (1) to (11) characterized in that said imaging means has an imaging resolution of 0.2 mm or less.

(13) A system for monitoring a state of production of electric-resistance-welded pipe as set forth in any one of (1) to (12) characterized in that said analyzing means finds brightness information or temperature information of the steel plate at said welded parts in the plate thickness direction based on the image data obtained by said imaging means and uses the found brightness information or temperature information to analyze a molten state of the steel plate and an butting state of the steel plate at said welded parts.

(14) A system for monitoring a state of production of electric-resistance-welded pipe as set forth in any one of (1) to (13) characterized in that said analyzing means compares brightness information or temperature information based on a plurality of image data obtained by said imaging means at different times and analyzes the state of oxides at said welded parts.

(15) A system for monitoring a state of production of electric-resistance-welded pipe as set forth in (13) characterized in that said analyzing means has a first judging means for comparing brightness information or temperature information of the steel plate at said welded parts in the plate thickness direction and a preset first and second threshold value and analyzing whether said welded parts are in a low heat input state or not when said brightness information or temperature information is at the first threshold value or below and a second judging means for judging that said welded parts are in an excessive heat input state when said brightness information or temperature information is the second threshold value or more.

(16) A system for monitoring a state of production of electric-resistance-welded pipe as set forth in (13) or (15) characterized by having a third judging means for judging that an butting angle of said welded parts is abnormal when a saturation region of said brightness information or temperature information is in a predetermined range.

(17) A system for monitoring a state of production of electric-resistance-welded pipe as set forth in (14) characterized in that said analyzing means has a differential image generating means for generating differential data of two image data obtained by said imaging means at different times and a change judging means for judging if said welded parts have had a preset threshold value or more of brightness change or temperature change based on differential data generated by said differential image generating means and judges that said welded parts have oxides when said change judging means judges that said welded parts have had said threshold value or more of brightness change or temperature change and judges that said welded parts have no oxides when said change judging means judges that said welded parts have no threshold value or more of brightness change or temperature change.

The method for monitoring the state of production of electric-resistance-welded pipe of the present invention is a method for monitoring the state of production of electric-resistance-welded pipe which monitors on-line the state of welded parts of steel plate formed into a tube shape for producing electric-resistance-welded pipe, characterized by having, for a system for monitoring a state of production of electric-resistance-welded pipe, an imaging step of obtaining light emitted from said welded parts and converting this to image data, an analyzing step of analyzing the state of the steel plate at said welded parts in the plate thickness direction based on said image data, and a displaying step of displaying results of said analysis at the display device.

Further, the invention has as its gist the following.

(18) A method for monitoring the state of production of electric-resistance-welded pipe, for a system for monitoring a state of production of electric-resistance-welded pipe as set forth in any one of said (1) to (17), which monitors the state of welded parts on-line when forming steel plate into a tube shape and heating the two ends of said steel plate for producing electric-resistance-welded pipe, said method for monitoring the state of production of electric-resistance-welded pipe characterized, by having an imaging step of obtaining light emitted from said welded parts and converting that to image data, an analyzing step of analyzing a state of the steel plate at said welded part in the plate thickness direction based on said image data, and a displaying step of displaying the results of analysis on a display device.

(19) A method for monitoring the state of production of electric-resistance-welded pipe as set forth in (18) characterized in that said analyzing step finds brightness information or temperature information of the steel plate at said welded parts in the plate thickness direction based on said image data and uses the found brightness information or temperature information to analyze a molten state of the steel plate and welding material and an butting state of the steel plate at said welded parts.

(20) A method for monitoring the state of production of electric-resistance-welded pipe as set forth in (18) or (19) wherein said analyzing step compares the brightness information or temperature information based on a plurality of said image data obtained at different imaging times and analyzes the state of oxides at said welded parts.

(21) A method for monitoring the state of production of electric-resistance-welded pipe as set forth in any one of (18) to (20) characterized in that said analyzing step has a first judging step of comparing brightness information or temperature information of the steel plate at said welded parts in the plate thickness direction and a preset first and second threshold value and analyzing whether said welded parts are in a low heat input state or not when said brightness information or temperature information is at the first threshold value or below and a second judging step of judging that said welded parts are in an excessive heat input state when said brightness information or temperature information is the second threshold value or more.

(22) A method for monitoring the state of production of electric-resistance-welded pipe as set forth in (19) or (21) characterized by having a third judging step judging that an butting angle of said welded parts is abnormal when a saturation region of said brightness information or temperature information is in a predetermined range.

(23) A method for monitoring the state of production of electric-resistance-welded pipe as set forth in any one of (18) to (20) characterized in that said analyzing step has a differential image generating step of generating differential data of two image data obtained by said imaging means at different times and a change judging step of judging if said welded parts have had a preset threshold value or more of brightness change or temperature change based on differential data generated by said differential image generating step and judges that said welded parts have oxides when said change judging step judges that said welded parts have had said threshold value or more of brightness change or temperature change and judges that said welded parts have no oxides when said change judging step judges that said welded parts have no threshold value or more of brightness change or temperature change.

Here, the "two images obtained at different times" referred to in (17) and (23) means two images taken separated by a time interval, preferably two images taken separated by a time interval of within 30 msec.

Due to the present invention, the following effects are obtained. That is, it is possible to obtain a high definition image of light emitted from welded parts of steel plate formed into a tube shape so as to produce electric-resistance-welded pipe, possible to convert this to image data for analysis and display, and thereby possible to perform high precision analysis and display the results in a more easily understandable format by image processing or data processing. The results of this high precision analysis and easily understandable display enable higher precision, better response control, contribute to stable quality and improved productivity, and also remarkably improve the work efficiency of the operators and the monitoring ability.

Further, when making the light enter a container made at least in part by an insulated material, relaying an image based on the input light by relay lenses, and obtaining this by an imaging means, making the container an insulated material prevents the container from being melted by electromagnetic noise. Not only this, it is possible to set the imaging means in a location separated from the sources of electromagnetic noise, that is, the induction coil or contact tips, so it is possible to suppress the effects of noise and possible to capture an image of the welded parts from the side by a resolution in accordance with the resolution of the imaging means, so it is possible to obtain information on the welded parts more accurately than the past and on-line.

BRIEF DESCRIPTION OF THE DRAWINGS

FIG. 1 are views showing a first embodiment of the present invention and show an example of the configuration of an electric-resistance-welded pipe production line (electric-resistance-welded pipe production system).

FIG. 2 are views showing a first embodiment of the present invention and show an example of the detailed configuration of a CCD camera, conversion lens, and relay lens unit.

FIG. 5 are views showing a first embodiment of the present invention and show examples of an "image of welded parts of a tube-shaped steel strip" in the case of an butting angle of 0°.

FIG. 6 are views showing a first embodiment of the present invention and show examples of an "image of welded parts of a tube-shaped steel strip" in the cases where the butting angles differ.

FIG. 7 are views showing a first embodiment of the present invention and explaining an butting angle of the two ends of the tube-shaped steel strip.

FIG. 13 are views showing a first embodiment of the present invention and show conceptually an example of the process of forming a differential image.

FIG. 16 are views showing a first embodiment of the present invention and show another example of the configuration of an electric-resistance-welded pipe production line (electric-resistance-welded pipe production system).

FIG. 19 are views showing a third embodiment of the present invention and show an example of the configuration of an electric-resistance-welded pipe production line (electric-resistance-welded pipe production system).

FIG. 21 are views showing a first embodiment of the present invention and show an example of the detailed configuration of a relay lens unit.

FIG. 24 is a view showing a fourth embodiment of the present invention and shows another example of the configuration of an electric-resistance-welded pipe production line (electric-resistance-welded pipe production system).

FIG. 25 is a view showing a fifth embodiment of the present invention and shows an example of the configuration of an electric-resistance-welded pipe production line (electric-resistance-welded pipe production system).

Figure 3:
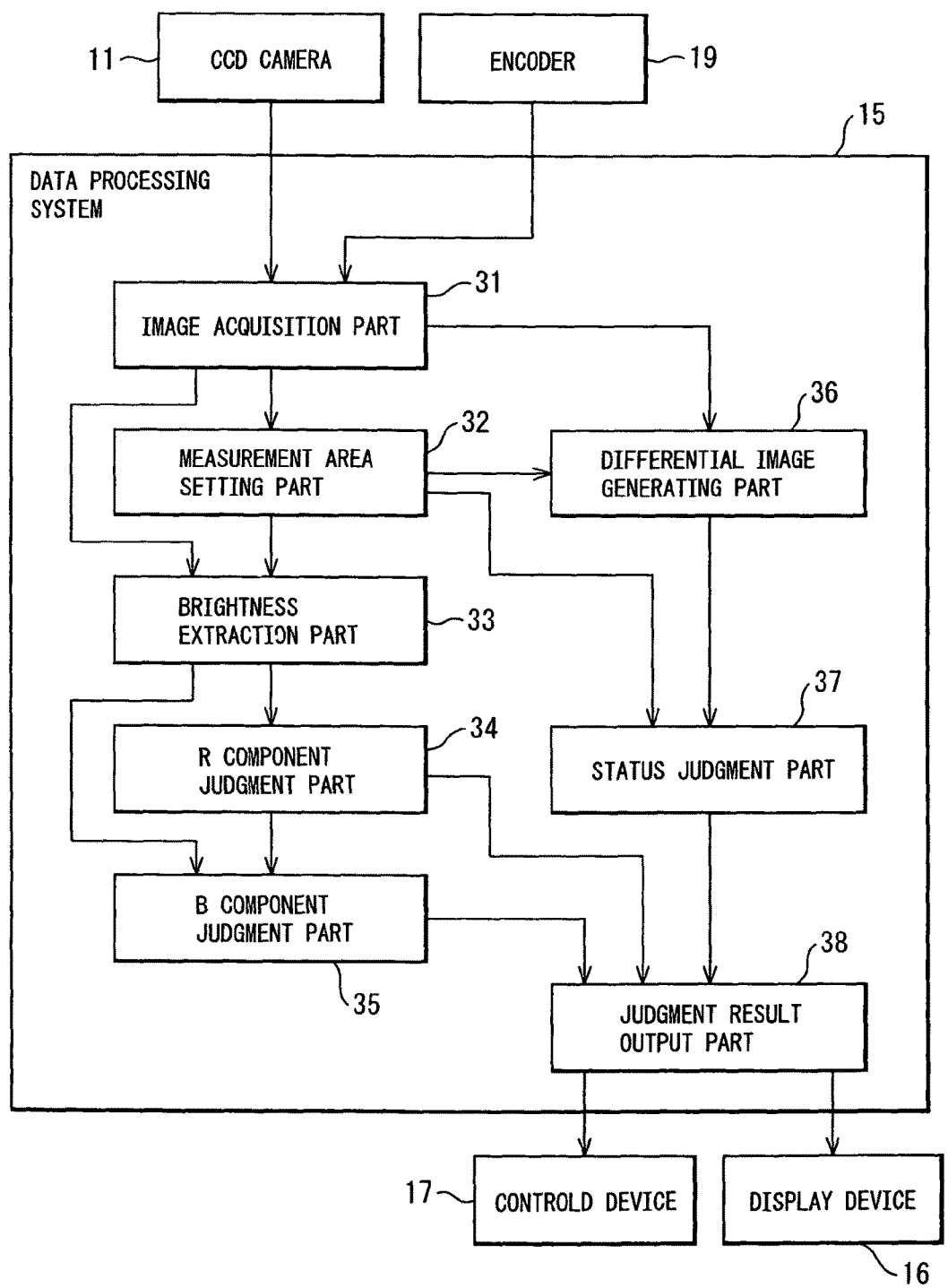
FIG. 3 is a view showing a first embodiment of the present invention and shows an example of the functional configuration of a data processing system.

BEST MODE FOR CARRYING OUT THE INVENTION (First Embodiment)

Below, a first embodiment of the present invention will be explained while referring to the drawings.

FIG. 1 are views showing an electric-resistance-welded pipe production line (electric-resistance-welded pipe production system). Further, in FIG. 1, for convenience in explanation, part of the configuration of the electric-resistance-welded pipe production line is omitted. Further, FIG. 1(a) is a perspective view, while FIG. 1(b) is a view of FIG. 1(a) seen from the horizontal direction. Further, in FIG. 1, it is assumed that the strip-shaped steel plate 1 progresses in the arrow direction (in FIG. 1(a), the direction from the front to rear, while in FIG. 1(b), the direction from left to right).

In the electric-resistance-welded pipe production line, the two ends of a strip-shaped steel plate 1 are forced together by using a not shown plurality of rolls to form the strip-shaped steel plate 1 into a tube shape. FIG. 1 show the state after the strip-shaped steel plate 1 becomes a tube shape in this way. Further, in the following explanation, the strip-shaped steel plate 1 formed into a tube shape is referred to as the "tube-shaped steel strip 1" in accordance with need.

An impeder 2 is positioned inside the tube-shaped steel strip 1. If the contact tips 3a, 3b are supplied with high frequency current, the action between the impeder 2 and the contact tips 3a, 3b causes high frequency current to flow through the tube-shaped steel strip 1. The high frequency current concentrates at the two ends of the tube-shaped steel strip 1 due to the skin effect. Due to this, the two ends of the tube-shaped steel strip 1 are heated and melted by the Joule's heat. Further, in the present embodiment, if necessary, the contact tips 3a, 3b are supplied with cooling water. Further, when directly electrically heating the tube-shaped steel strip 1, it is possible not to use an impeder 2, but to use the action of the contact tips 3a, 3b to make high frequency current flow through the tube-shaped steel strip 1. In this way, the impeder 2 is not an essential constitution.

Squeeze rolls 4a, 4b are arranged after the welded parts 5 of the tube-shaped steel strip 1 at positions facing each other across the tube-shaped steel strip 1. The heated and melted tube-shaped steel strip 1 is pressed by these squeeze rolls 4a, 4b so that the two ends are joined. When the heated and melted tube-shaped steel strip 1 is pressed by the squeeze rolls 4a, 4b, scale (oxides) is discharged together with part of the molten metal from the striking parts of the tube-shaped steel strip 1 (the parts of the two ends of the tube-shaped steel strip 1 first being joined) etc.

To monitor the state of the welded parts of the electric-resistance-welded pipe 6 formed in this way, a system for monitoring a state of production of electric-resistance-welded pipe (hereinafter, if necessary, abbreviated as the "monitoring system") is provided.

In FIG. 1, the monitoring system has a CCD camera 11, conversion lens 12, relay lens unit 13, air pump 14, data processing system 15, display device 16, control device 17, and power device 18.

FIG. 2 are views showing an example of the detailed configuration of the CCD camera 11, conversion lens 12, and relay lens unit 13. FIG. 2(a) is a view showing the overall configuration of the CCD camera 11, conversion lens 12, and relay lens unit 13, while FIG. 2(b) is a view showing the internal configuration of the relay lens unit 13.

In FIG. 2(a), the CCD camera 11 is for example an imaging device having a VGA or higher resolution. The conversion lens 12 is an optical module for forming the image obtained from the later explained relay lens unit 13 on the imaging area (CCD) in the CCD camera 11. In the present embodiment, the "imaging means" is realized by using the CCD camera 11 and conversion lens 12.

Further, the relay lens unit 13 has a main body 13a and an air pipe 13b. The main body 13a is for relaying the "image of the welded parts 5 of the tube-shaped steel strip 1" fetched from its front end (in its original size (or enlarged)) to the conversion lens 12. On the other hand, the air pipe 13b is a pipe attached to the surface of the main body 13a in a spiral and made from an insulated material. Air supplied from an air pump 14 flows inside it.

As shown in FIG. 2(b), the main body 13a of the relay lens unit 13 has a container 21, heat resistant glass 22, mirror 23, and relay lenses 24.

The container 21 is a tube shaped pipe formed using an insulated material comprised of an insulator (nonconductor) or semiconductor (preferably an insulator having a specific resistance of $10^5$ Ω·cm or more). As the material of the container 21, for example, a ceramic, plastic, glass, etc. may be used. Further, it is not necessary to form all of the container 21 using an insulated material. It is sufficient to form at least part (preferably the part of the front end side (side where the mirror 23 is attached)) using an insulated material so that the container 21 is not melted.

The opening at the front end side of the container 21 has heat resistant glass 22 attached to it. As the heat resistant glass 22, for example, quartz glass may be used.

The mirror 23 is provided inside the container 21 at a position where the mirror surface faces the heat resistant glass 22 with a predetermined angle. Furthermore, the mirror 23 is slanted so that the "image of the welded parts 5 of the tubeshaped steel strip 1" entering through the heat resistant glass 22 is reflected out in the pipe axial direction of the container 21 (direction of relay lenses 24). For the material of the mirror 23, it is preferable to use a dielectric multilayer film reflecting visible light with a high efficiency.

The relay lenses 24 are provided inside the container 21 at positions facing the mirror surface of the mirror 23 with a predetermined angle. They are for relaying the "image of the welded parts 5 of the tube-shaped steel strip 1" reflected from the mirror 23 to the conversion lens 12 attached to the base end of the container 21.

As shown in FIG. 2(b), in the present embodiment, the mirror 23 is attached inside the container 21 so as to have angles of 45° with respect to the pipe axial direction of the container 21 and the direction of the light entering through the heat resistant glass 22.

As explained above, a spiral shaped air pipe 13b is attached to the surface of the main body 13a. Therefore, by running, for example, air lower in temperature than ordinary temperature through the air pipe 13b, it is possible to suppress the temperature rise of the main body 13a. Further, as shown in FIG. 2(b), by discharging the air 25 from the air pipe 13b over the heat resistant glass 22, it is possible to suppress the deposition of scale etc. on the heat resistant glass 22.

In this way, in the present embodiment, the "container" is realized by using the container 21, while the "transparent material" is realized by using the heat resistant glass 22. Further, by the "pipe made of an insulated material" is realized using the air pipe 13b, while the "supplying means" is realized by using the air pump 14.

Returning to the explanation of FIG. 1, the data processing system 15 is provided with a CPU, ROM, RAM, HDD, keyboard, mouse, various types of interfaces, image input board, etc. The data processing system 15 receives as input the "image data of the welded parts 5 of the tube-shaped steel strip 1" obtained using the configured relay lens unit 13, conversion lens 12, and CCD camera 11 and receives as input "positional data relating to the position of the welded parts 5 of the tube-shaped steel strip 1" from an encoder 1. Further, the data processing system 15 analyzes the molten state, butting state, and state of scale of the welded parts 5 of the tube-shaped steel strip 1 based on the input "image data and positional data of the welded parts 5 of the tube-shaped steel strip 1".

The display device 16 is for example provided with a liquid crystal display and displays the results of the analysis performed by the data processing system 15 (the molten state and butting state of the welded parts 5 of the tube-shaped steel strip 1) etc.

The control device 17 controls the operation of the power device 18 and not shown rolls etc. based on the results of analysis performed by the data processing system 15 (the molten state and butting state of the welded parts 5 of the tube-shaped steel strip 1).

The power device 18 supplies power to the contact tips 3a, 3b in accordance with control by the control device 17 so that high frequency current flows through the tube-shaped steel strip 1.

FIG. 3 is a view showing an example of the functional configuration of the data processing system 15.

In FIG. 3, the image acquisition part 31 obtains the image data of the welded parts 5 of the tube-shaped steel strip 1 from the CCD camera 11 and obtains positional data relating to the position of the tube-shaped steel strip 1 at that time from the encoder 19. Further, the image acquisition part 31 links these data together and stores them in an HDD or other storage medium.

The image acquisition part 31 is, for example, realized by using an image input board, an interface with the encoder 19, a CPU, ROM, RAM, etc.

Figure 4:
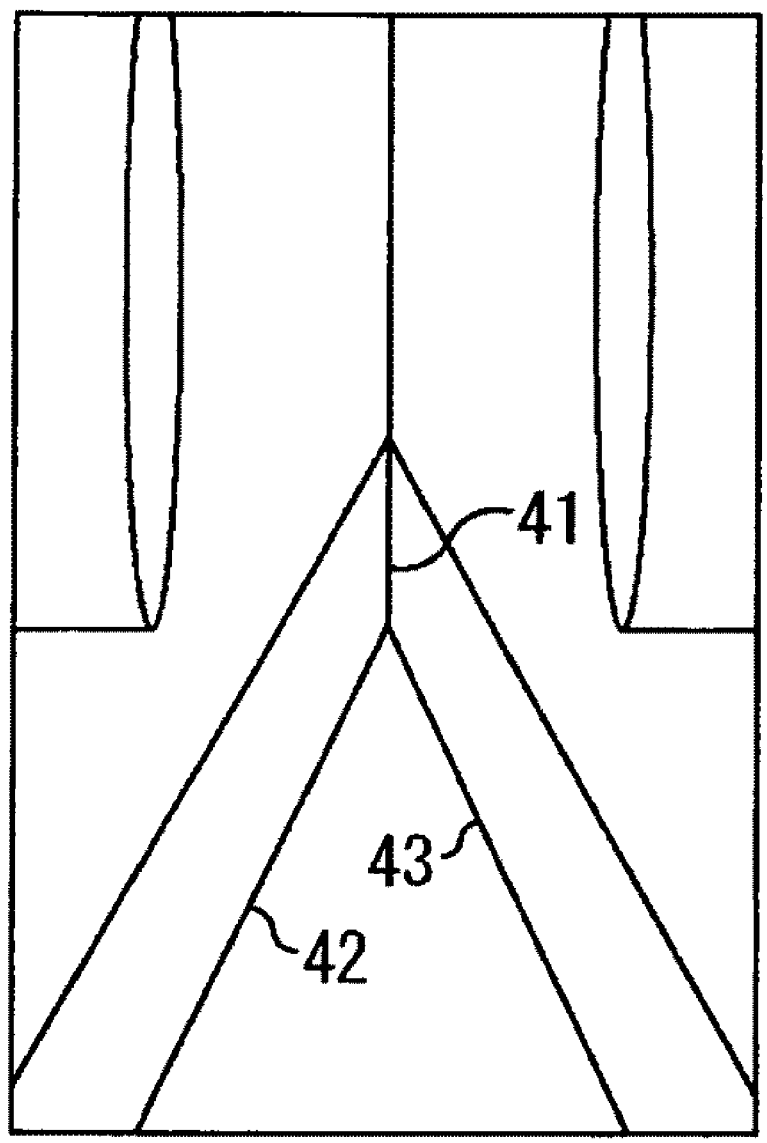
FIG. 4 is a view showing a first embodiment of the present invention and shows an example of the state of two ends of a tube-shaped steel strip (welded part).

FIG. 4 is a view showing an example of the state of the two ends of the tube-shaped steel strip 1 (welded part). Further, FIG. 5 are views showing examples of the "image of the welded parts 5 of the tube-shaped steel strip 1" when the butting angle is 0°. Specifically, FIG. 5(a) is a view showing an example of the "image of the welded parts 5 of the tube-shaped steel strip 1" in the case where the heat input state (molten state) is normal. FIG. 5(b) is a view showing an example of the "image of the welded parts 5 of the tube-shaped steel strip 1" in the case where the heat input state is a low input heat. FIG. 5(c) is a view showing an example of the "image of the welded parts 5 of the tube-shaped steel strip 1" in the case where the heat input state is excessive input heat.

When the heat input state (molten state) is normal, as shown in FIG. 5(a), the brightness in the welded parts 5 (part corresponding to region 41 of FIG. 4, the part appearing as gray longitudinal lines in FIG. 5(a)) is in a suitable range and generally constant. As opposed to this, when the heat input state is low input heat, the heat of the welded parts 5 becomes insufficient. As shown in FIG. 5(b), the brightness at the welded parts 5 is low and the image becomes dark. Further, when the heat input state is excessive input heat, an arc forms between the two ends of the welded parts 5 and, as shown in FIG. 5(c), the brightnesses at the two ends of the welded parts 5 become remarkably high (white parts of FIG. 5(c)).

FIG. 6 show examples of the "image of the welded parts 5 of the tube-shaped steel strip 1" in the cases where the butting angles differ. Specifically, FIG. 6(a) is a view showing an example of the "image of the welded parts 5 of the tube-shaped steel strip 1" in the case where the butting angle of the welded parts 5 of the tube-shaped steel strip 1 is normal (about) 0°. FIG. 6(b) is a view showing an example of the "image of the welded parts 5 of the tube-shaped steel strip 1" in the case where the butting angle of the welded parts 5 of the tube-shaped steel strip 1 is a V-shape. FIG. 6(c) is a view showing an example of the "image of the welded parts 5 of the tube-shaped steel strip 1" in the case where the butting angle of the welded parts 5 of the tube-shaped steel strip 1 is an inverted V-shape. Further, in FIG. 6, the heat input state of the welded parts 5 of the tube-shaped steel strip 1 is made constant.

Here, the butting angle of the welded parts 5 of the tube-shaped steel strip 1 being normal, as shown in FIG. 7(a), means the welded parts 5 of the tube-shaped steel strip 1 (the two ends) are substantially parallel. Further, the butting angle of the welded parts 5 of the tube-shaped steel strip 1 being a V-shape, as shown in FIG. 7(b), means the state where the welded parts 5 of the tube-shaped steel strip 1 (the two ends) open from the outside to the inside. Further, the butting angle of the welded parts 5 of the tube-shaped steel strip 1 being an inverted V-shape, as shown in FIG. 7(c), means the state where the welded parts 5 of the tube-shaped steel strip 1 (the two ends) open from the inside to the outside.

When the butting angle of the welded parts 5 of the tube-shaped steel strip 1 is normal, as shown in FIG. 6(a), the brightness of the welded parts 5 is in a suitable range and generally constant. As opposed to this, when the butting angle of the welded parts 5 of the tube-shaped steel strip 1 is a V-shape, an arc forms at the inside ends of the welded parts 5 and, as shown in FIG. 6(b), the brightness of the inside ends of the welded parts 5 becomes remarkably higher (white parts of FIG. 6(b)). Further, when the butting angle of the welded parts 5 of the tube-shaped steel strip 1 is an inverted V-shape, an arc forms at the outside ends of the welded parts 5 and, as shown in FIG. 6(c), the brightness of the outside ends of the welded parts 5 becomes remarkably higher (white parts of FIG. 6(c)).

Figure 8:
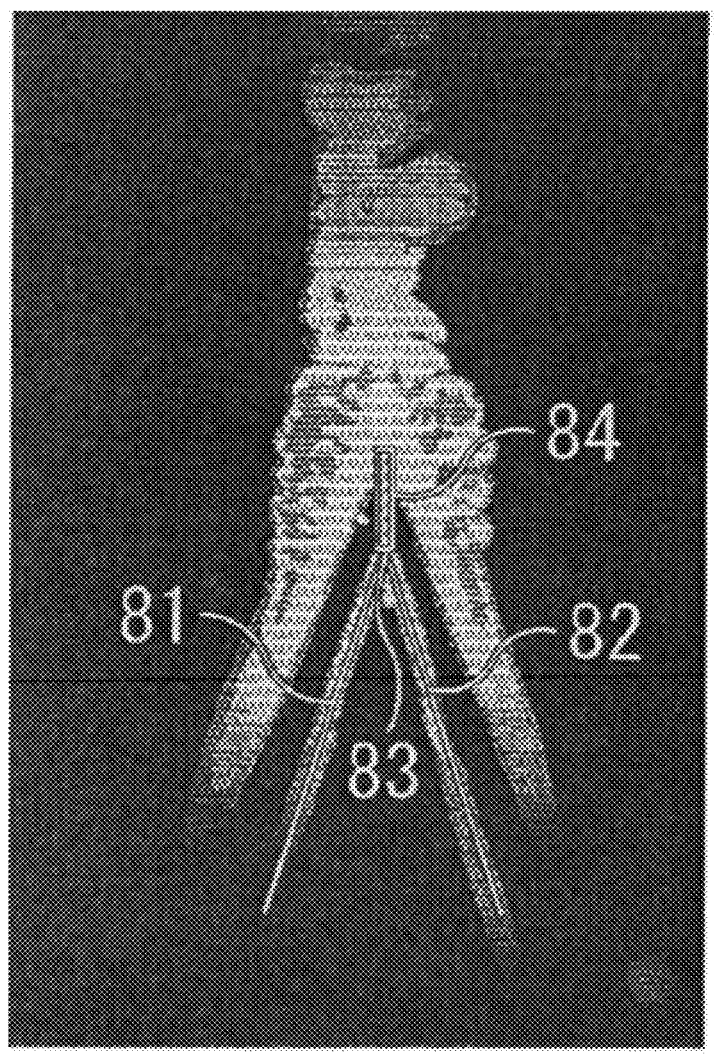
FIG. 8 is a view showing a first embodiment of the present invention and shows an example of a first measurement area.

Returning to the explanation of FIG. 3, the measurement area setting part 32, when obtaining such an "image of the welded parts 5 of the tube-shaped steel strip 1", inserts lines matched with the shapes of the inside ends of the tube-shaped steel strip 1 (parts corresponding to regions 42, 43 of FIG. 4) into the image and detects the intersection of the lines as the positions of the inside ends of the butting surfaces (welded parts 5). Further, the measurement area setting part 32 sets a first measurement area having the position of the detected inside ends as the center of the lower end. FIG. 8 is a view showing an example of the first measurement area. In the example shown in FIG. 8, the intersection 83 of the two lines 81, 82 inserted matching with the shapes of the inside ends of the tube-shaped steel strip 1 is detected as the position of the inside ends of the butting surfaces (welded parts 5). Further, a first measurement area 84 is set having the inside ends of the butting surfaces (welded parts 5) (intersection 83) as the center of the lower end, having a longitudinal direction of a length corresponding to the thickness of the tube-shaped steel strip 1 (plate thickness), and having a horizontal direction of a length of for example 20 pixels. Further, the first measurement area 84 is given a horizontal direction of a certain degree of length, as explained above, since the butting surfaces (welded parts 5) become a V-shape, become an inverted V-shape, or otherwise the butting surfaces (welded parts 5) do not become vertical.

The measurement area setting part 32 can be realized, for example, by using a CPU, ROM, RAM, etc.

Returning to the explanation of FIG. 3, the brightness extraction part 33 finds the maximum brightness for each line in the first measurement area 84 set at the measurement area setting part 32 (that is, finds the maximum brightness at each line in the first measurement area 84). Due to this, first order brightness information is obtained. Further, it separates the maximum brightness for each line, that is, the first order brightness information, into an R (Red) component, G (Green) component, and B (Blue) component and finds the brightness distributions of the R component, G component, and B component (first order brightness information of RGB components in first measurement area 84). In the present embodiment, for example, it extracts the component having a wavelength of 400 nm to less than 500 nm as the R component, extracts the component having a wavelength of 500 nm to less than 550 nm as the G component, and extracts the component having a wavelength of 550 nm to less than 700 nm as the B component.

The brightness extraction part 33, for example, can be realized by use of a CPU, ROM, RAM, etc.

The R component judgment part 34 refers to the brightness distribution of the R component obtained by the brightness extraction part 33 and judges if region where the brightness of the R component is a preset first threshold value or less is a certain region (for example, 60% of the butting parts (center part)) or more. If the result of this judgment is that the region where the brightness of the R component is a first threshold value or less is a certain region or more, it is judged that the welded parts 5 of the tube-shaped steel strip 1 are in a low input heat (cold contact) state. Further, the threshold value of the judgment is determined by analyzing the correlation between the captured data and the results of a Charpy test. At this time, to make mistaken judgment more difficult even if the brightness level of the image as a whole changes, it is possible to make a relative level change between the brightness level of the two ends of the butting parts and the inside of the butting part (for example, whether after calculating the average value of the two, the inside of the butting part/two ends of the butting parts becomes 50% or more) the threshold value.

Figure 9:
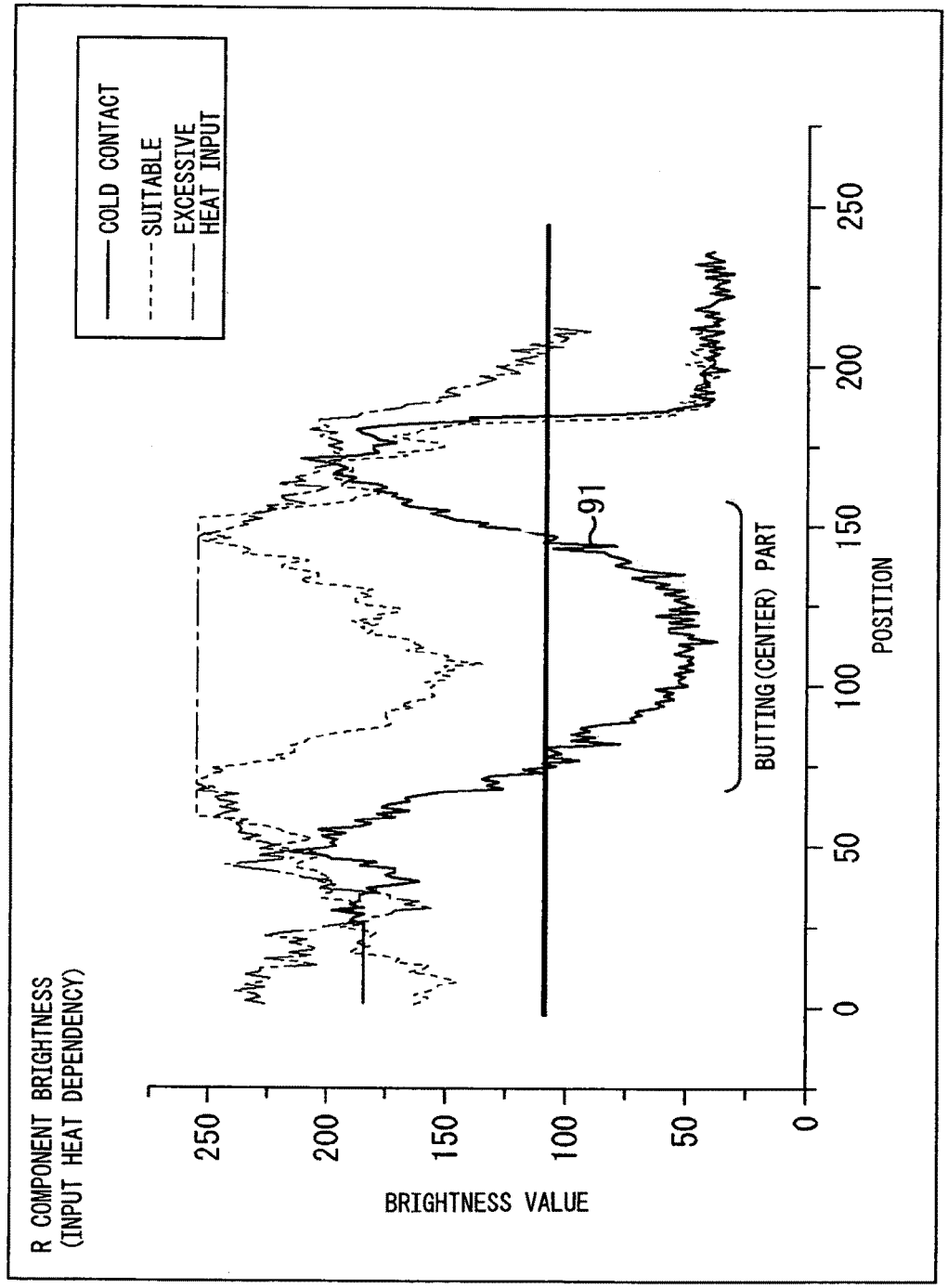
FIG. 9 is a view showing a first embodiment of the present invention and shows an example of a brightness distribution of an R component.

FIG. 9 is a view showing an example of the brightness distribution of the R component. In the example shown in FIG. 9, if like in the graph (brightness distribution) 91, it is judged that the welded parts 5 of the tube-shaped steel strip 1 are in a low input heat (cold contact) state. Further, in FIG. 9, the values on the abscissa are set so that the further to the outside, the larger the value.

The R component judgment part 34 can, for example, be realized by using a CPU, ROM, RAM, etc.

When the R component judgment part 34 judges that the region where the brightness of the R component is a threshold value or less is not a certain region or more, the B component judgment part 35 refers to the brightness of the B component distribution obtained by the brightness extraction part 33 and judges whether the region where the brightness of the B component is saturated is a certain region (for example, 40% of the butting parts (center part)) or more. When the result of this judgment is that the region where the brightness of the B component is a preset second threshold value or more or the region where it is saturated is a certain region or more, it is judged that the welded parts 5 of the tube-shaped steel strip 1 are in an excessive heat input state.

Figure 10:
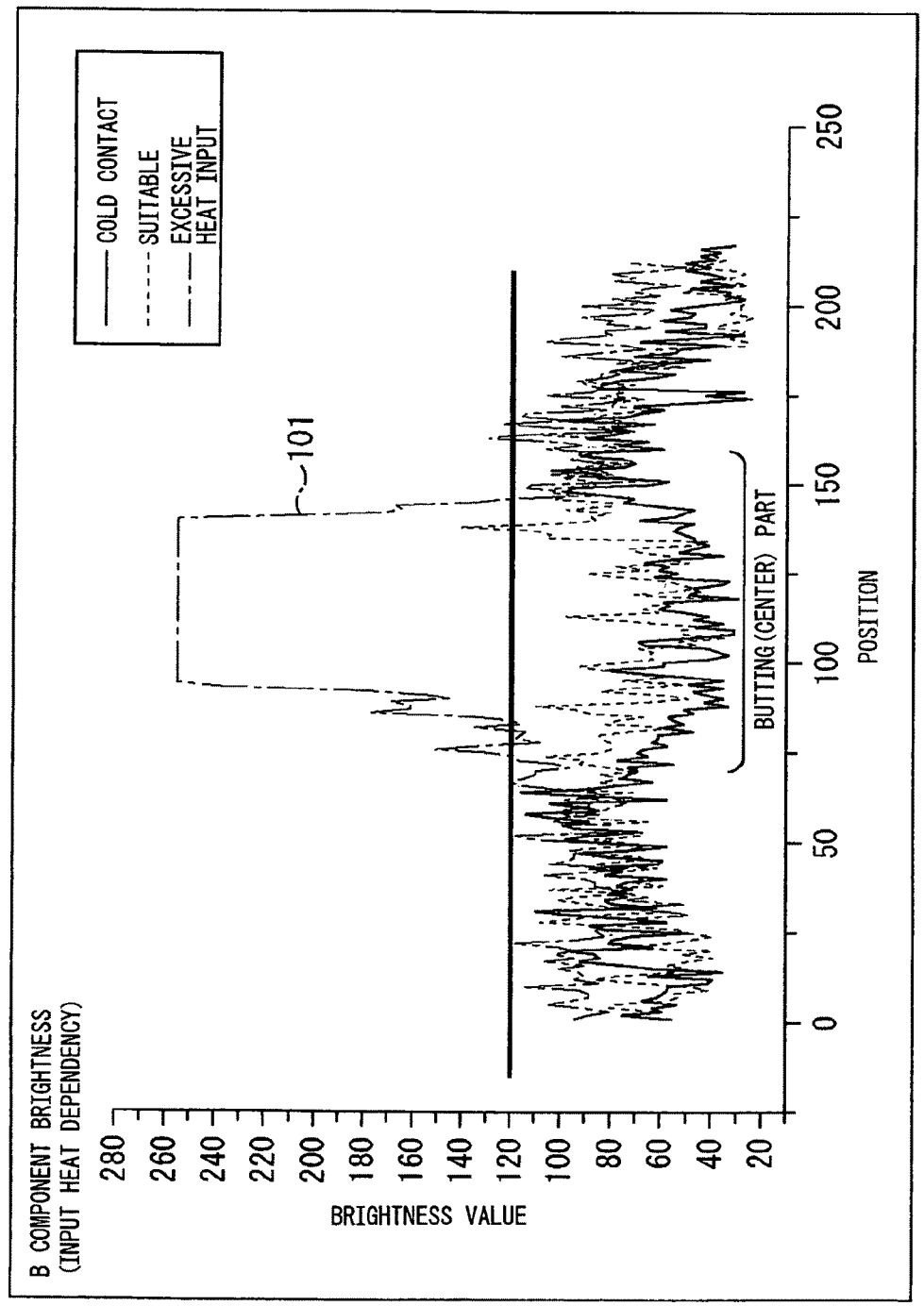
FIG. 10 is a view showing a first embodiment of the present invention and shows a first example of a brightness distribution of a B component.

FIG. 10 is a view showing a first example of the brightness distribution of the B component. In the example shown in FIG. 10, if becoming as shown by the graph (brightness distribution) 101, it is judged that the welded parts 5 of the tube-shaped steel strip 1 are in an excessive heat input state. Further, in the same way as FIG. 9, in FIG. 10 as well, the values on the abscissa are set so that the further to the outside, the larger the value.

On the other hand, when judging that the region where the brightness of the B component is saturated is not a certain region or more, the B component judgment part 35 judges if the region where the brightness of the B component is saturated is present at only a specific position. Here, the "specific position" means the position corresponding to the outside end or inside end of the butting surfaces (welded parts 5). When the result of this judgment is that the region where the brightness of the B component is saturated is not only at a specific position, the B component judgment part 35 judges that the welded parts 5 of the tube-shaped steel strip 1 are normal.

On the other hand, when the region where the brightness of the B component is saturated is present only at a specific position, it is judged that the butting angle of the welded parts 5 of the tube-shaped steel strip 1 is abnormal. Further, when the region where the brightness of the B component is saturated is at a position corresponding to the outside end of the butting surfaces (welded parts 5), it is judged that the butting surfaces (welded parts 5) are in an inverted V-shape, while when it is at a position corresponding to the inside end of the butting surfaces (welded parts 5), it is judged that the butting surfaces (welded parts 5) are in a V-shape.

Figure 11:
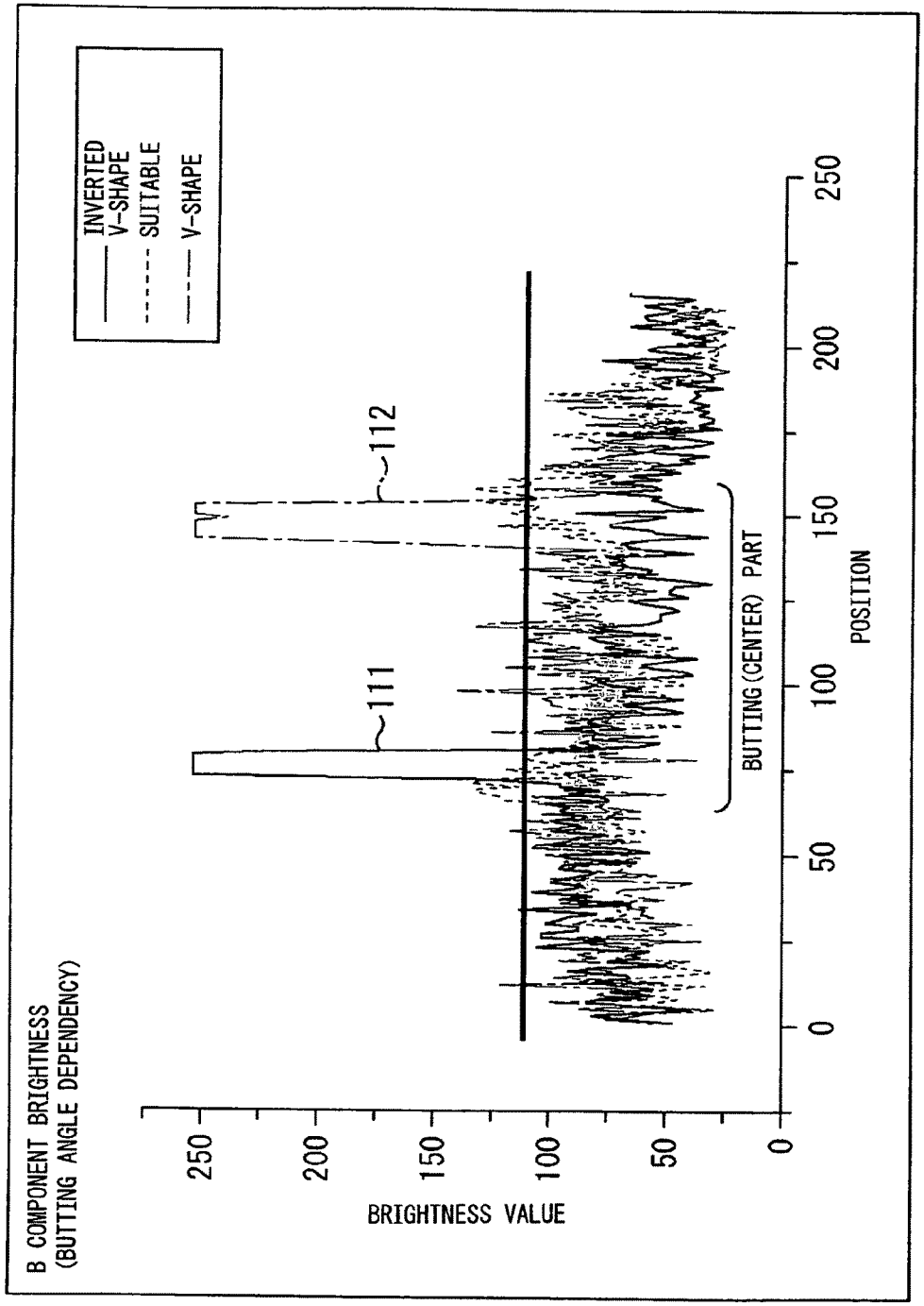
FIG. 11 is a view showing a first embodiment of the present invention and shows a second example of a brightness distribution of a B component.

FIG. 11 is a view showing a second example of the brightness of the B component distribution. In the example shown in FIG. 11, when like the graph (brightness distribution) 111, it is judged that the butting surfaces (welded parts 5) are in an inverted V-shape. Further, when like the graph (brightness distribution) 112, it is judged that the butting surfaces (welded parts 5) are in a V-shape. Further, in FIG. 11 as well, like FIG. 9 and FIG. 10, the values on the abscissa are set so that the further to the outside, the larger the value.

The B component judgment part 35 is realized, for example, by using a CPU, ROM, RAM, etc.

Figure 12:
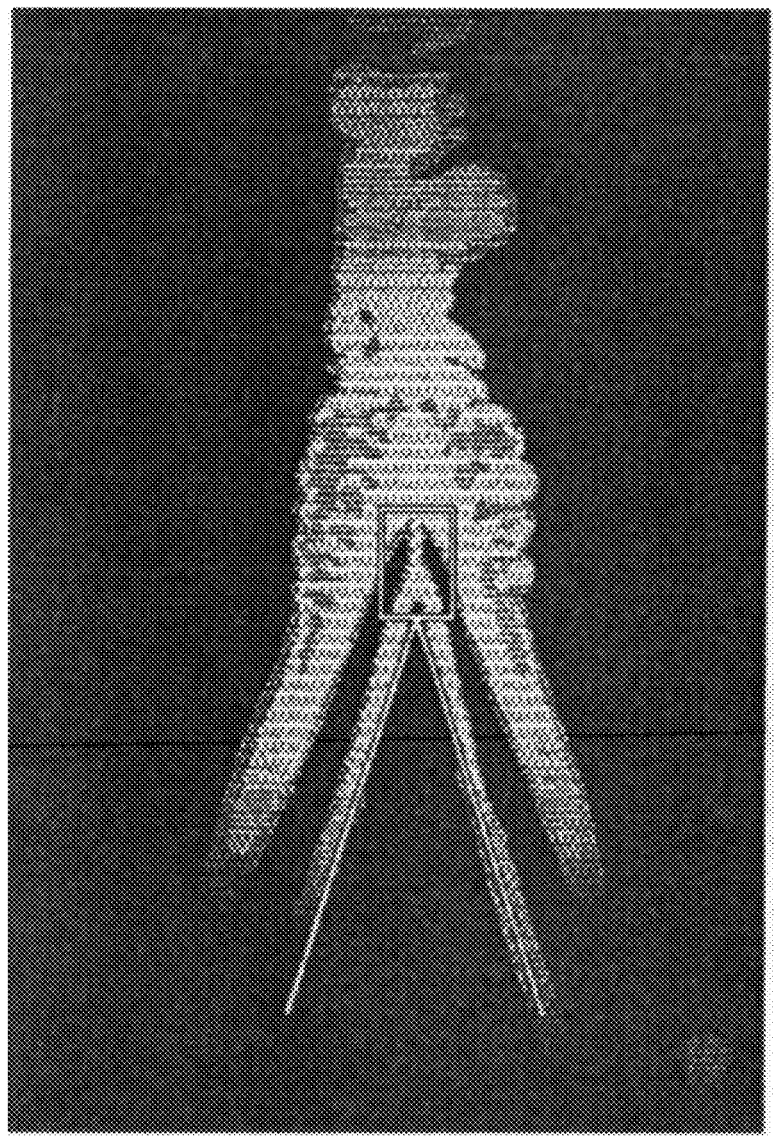
FIG. 12 is a view showing a first embodiment of the present invention and shows an example of a second measurement area.

Returning to the explanation of FIG. 3, the above-mentioned measurement area setting part 32 sets the second measurement area 84 in addition to the first measurement area 84 when the image of the welded parts 5 of the tube-shaped steel strip 1 is obtained. As explained above, the first measurement area 84 is an area for analyzing the molten state and butting state of the welded parts 5 of the tube-shaped steel strip 1. As opposed to this, the second measurement area is an area for analyzing the state of entry of scale (oxides) at the welded parts 5 of the tube-shaped steel strip 1. Specifically, the measurement area setting part 32 sets as the second measurement area a measurement area longer than the first measurement area 84 in horizontal direction length (for example, having length of 200 pixels). The horizontal direction length of the second measurement area is made longer than the first measurement area 84 in this way so as to enable the state of entry of scale to the welded parts 5 of the tube-shaped steel strip 1 to be grasped from as far away as possible. Further, aside from the horizontal direction length, the second measurement area is set by the same method as the first measurement area 84, so a detailed explanation of the method of setting the second measurement area will be omitted. FIG. 12 is a view showing an example of the second measurement area. As shown in FIG. 12, the second measurement area 121 has a longer length in the horizontal direction than the first measurement area 84 shown in FIG. 8.

Returning to the explanation of FIG. 3, when the differential image generation part 36 receives two "images of the welded parts 5 of the tube-shaped steel strip 1" consecutive in time (different in capturing time), it generates a differential image of these two images so as to compare these two images. Here, the interval for capturing images for generating a differential image is made a predetermined time interval. Two images captured at a time interval of preferably within 30 msec are preferable. For example, it is possible to generate a differential image of two images captured consecutively. FIG. 13 are views conceptually showing an example of the process for generating a differential image. FIG. 13(a) shows an image before entry of scale into the second measurement area 121, while FIG. 13(b) shows an image when scale enters the second measurement area 121. Further, FIG. 13(c) shows a differential image of the image shown in FIG. 13(a) and the image shown in FIG. 13(b).

The differential image generation part 36 can, for example, be realized using a CPU, ROM, RAM, etc.

The status judgment part 37 judges based on the above obtained differential image if there has been a change in brightness of a threshold level or more in the second measurement area 121. When the result of this judgment is that there has been no change in bright of the threshold value or more in the second measurement area 121, it is judged that scale has not entered the welded parts 5 of the tube-shaped steel strip 1. On the other hand, when it is judged that there has been a change in brightness of the threshold value or more in the second measurement area 121, it is judged that scale has entered the welded parts 5 of the tube-shaped steel strip 1.

The status judgment part 37 can, for example, be realized using a CPU, ROM, RAM, etc. Further, in the present embodiment, it is designed to judge if scale has entered the welded parts 5 of the tube-shaped steel strip 1 based on the differential image of two images consecutive in time, but this is not necessarily required. For example, it is also possible to judge if scale has entered the welded parts 5 of the tube-shaped steel strip 1 based on a plurality of differential images consecutively obtained.

The judgment result output part 38 generates display data for displaying the state of the welded parts 5 of the tube-shaped steel strip 1 on the display device 16 and outputs it to the display device 16 based on the result of judgment by the R component judgment part 34 (result of judgment that the welded parts 5 of the tube-shaped steel strip 1 are in a low input heat (cold contact) state), the result of judgment of the B component judgment part 35 (result of judgment that the welded parts 5 of the tube-shaped steel strip 1 are in an excessive heat input state, result of judgment that the welded parts 5 are in a V-shape or inverted V-shape, and result of judgment that the welded parts 5 of the tube-shaped steel strip 1 are normal), and the result of judgment of the status judgment part 37 (result of judgment of the state of scale at the welded parts 5 of the tube-shaped steel strip 1). Due to this, it is possible to simultaneously monitor on-line the "heat input state and butting state" of the welded parts 5 of the tube-shaped steel strip 1 and the presence of any scale at the welded parts 5 of the tube-shaped steel strip 1 (when there is scale, its position and size).

Further, the judgment result output part 38 outputs information showing the results of judgment of the R component judgment part 34, B component judgment part 35, and status judgment part 37 to the control device 17. Due to this, the control device 17 can control the operation of the electric-resistance-welded pipe production line in accordance with the "heat input state and butting state" of the welded parts 5 of the tube-shaped steel strip 1 and the presence of any scale at the welded parts 5 of the tube-shaped steel strip 1. For example, when the welded parts 5 of the tube-shaped steel strip 1 are in the low input heat (cold contact) state, the control device 17 increases the power supplied to the contact tips 3a, 3b. Conversely, when the welded parts 5 of the tube-shaped steel strip 1 is in the excessive heat input state, the control device 17 reduces the power supplied to the contact tips 3a, 3b. Further, when the welded parts 5 is a V-shape or inverted V-shape, the control device 17 controls the not shown shaping rolls in accordance with the butting state of the welded parts 5. Furthermore, when scale enters to the welded parts 5 of the tube-shaped steel strip 1, the control device 17 controls the power supplied to the contact tips 3a, 3b and the rolls (not shown shaping rolls, squeeze rolls 4a, 4b, etc.) to adjust the amount of formation of scale etc.

The judgment result output part 38 can, for example, be realized by using interfaces with the CPU, ROM, RAM, video RAM, image processor, and display device 16, an interface with the control device 17, etc.

Figure 14:
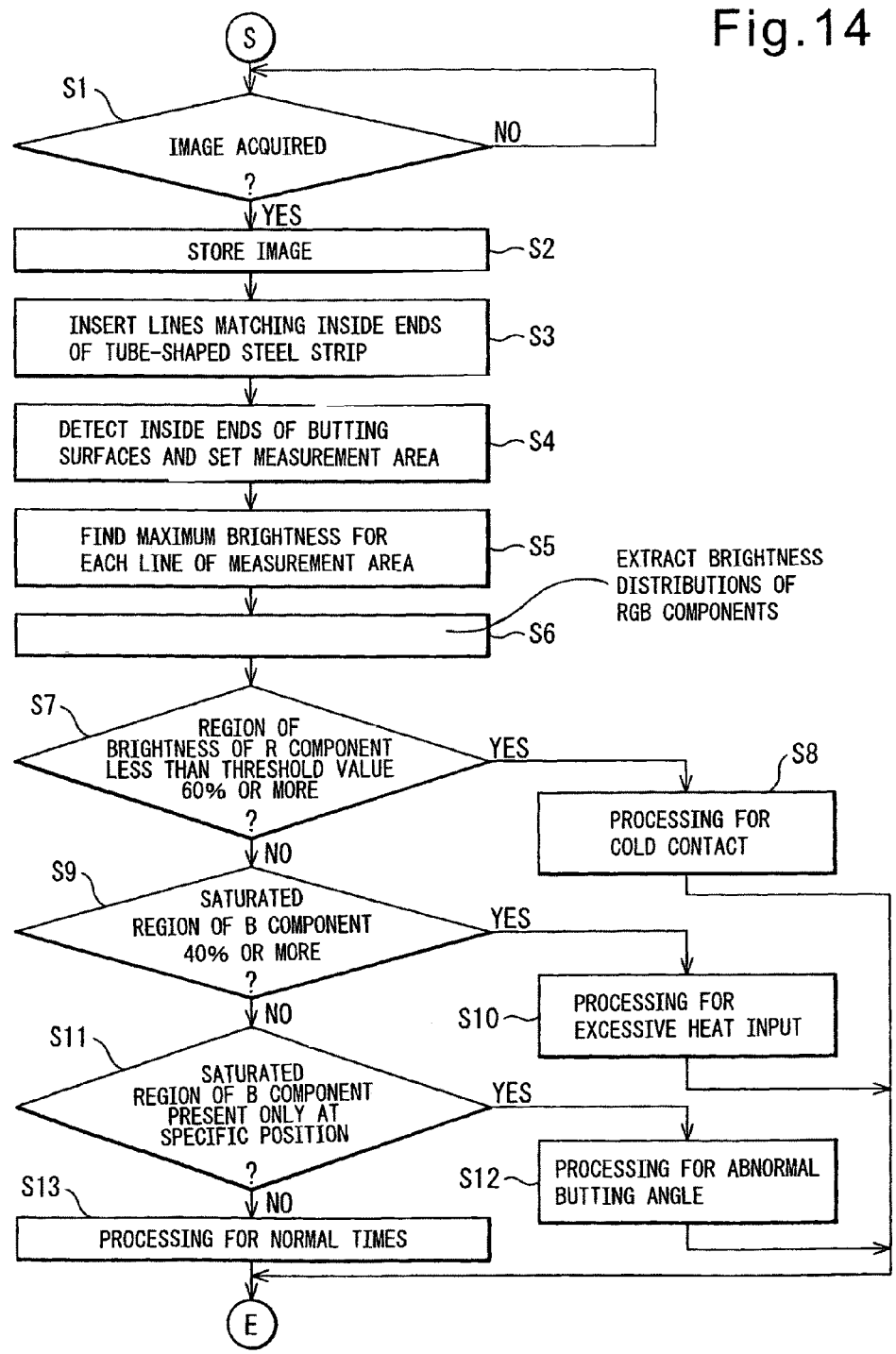
FIG. 14 is a flow chart showing a first embodiment of the present invention and explains an example of operation of a data processing system when analyzing a "heat input state and butting state" of welded parts of a tube-shaped steel strip.

Next, while referring to the flow chart of FIG. 14, a example of the operation of the data processing system 15 when analyzing the "heat input state and butting state" of the welded parts 5 of the tube-shaped steel strip 1 will be explained.

First, at step S1, the image acquisition part 31 stands by until acquiring the image data of the welded parts 5 of the tube-shaped steel strip 1 from the CCD camera 11 and obtaining the positional data relating to the position of the tube-shaped steel strip 1 at that time from the encoder 19. Further, when these data are obtained, the routine proceeds to step S2.

When proceeding to step S2, the image acquisition part 31 links the image data and the positional data obtained at step S1 with each other and stores them in a storage medium.

Next, at step S3, the measurement area setting part 32 reads the image data stored at step S2. Further, the measurement area setting part 32 uses the read image data to insert lines 81 and 82 matched with the shapes of the inside ends of the tube-shaped steel strip 1 into the image of the welded parts 5 of the tube-shaped steel strip 1.

Next, at step S4, the measurement area setting part 32 detects the intersection 83 of the lines 81, 82 inserted at step S3 as the position of the inside ends of the butting surfaces (welded parts 5). Further, the measurement area setting part 32 sets a first measurement area 84 having the inside ends of the butting surfaces (intersection 83) as the center of the bottom end (see FIG. 8).

Next, at step S5, the brightness extraction part 33 finds the maximum brightness for each line at the first measurement area 84 set at step S4.

Next, at step S6, the brightness extraction part 33 separates "the maximum brightness for each line" found at step S5 into the R component, G component, and B component and finds the brightness distributions of the R component, G component, and B component.

Next, at step S7, the R component judgment part 34 refers to the brightness distribution of the R component found at step S6 and judges if the region where the brightness of the R component is a threshold value or less is a certain region (for example, region of 60% of butting part) or more. When the result of this judgment is that the region where the brightness of the R component is a threshold value or less is a certain region or more, the routine proceeds to step S8. If the routine proceeds to step S8, the judgment result output part 38 judges that the welded parts 5 of the tube-shaped steel strip 1 are in the low input heat (cold contact) state, generates display data for displaying that state, and outputs it to the display device 16. This display data includes the image data stored at step S2 and data showing that the welded parts 5 of the tube-shaped steel strip 1 are in a low input heat (cold contact) state. The display device 16 displays an image based on this display data. Further, the judgment result output part 38 outputs data showing that the welded parts 5 of the tube-shaped steel strip 1 are in a low input heat (cold contact) state to the control device 17. The control device 17 controls the operation of the power device 18 etc. based on this data. Further, it ends the operation by the flow chart of FIG. 14.

On the other hand, when the region where the brightness of the R component is a threshold value or less is not the certain region or more, the routine proceeds to step S9. If the routine proceeds to step S9, the B component judgment part 35 judges if the region where the brightness of the B component is saturated found at step S6 is a certain region or more. When the result of this judgment is that the region where the brightness of the B component is saturated is a certain region or more, the routine proceeds to step S10. When the routine proceeds to step S10, the judgment result output part 38 judges that the welded parts 5 of the tube-shaped steel strip 1 are in the excessive heat input state, generates display data for displaying this state, and outputs this to the display device 16. This display data includes the image data stored at step S2 and data showing that the welded parts 5 of the tube-shaped steel strip 1 are in the excessive heat input state. The display device 16 displays an image based on this display data. Further, the judgment result output part 38 outputs data showing that the welded parts 5 of the tube-shaped steel strip 1 are in the excessive heat input state to the control device 17. The control device 17 controls the operation of the power device 18 based on this data. Further, it ends the operation by the flow chart of FIG. 14.

On the other hand, when the region where the brightness of the B component is saturated is not a certain region or more, the routine proceeds to step S11. When the routine proceeds to step S11, the B component judgment part 35 judges if the region where the brightness of the B component is saturated found at step S6 is only at a specific position. When the result of this judgment is that the region where the brightness of the B component is saturated is only at a specific position, the routine proceeds to step S12. When the routine proceeds to step S12, the judgment result output part 38 judges that the welded parts 5 of the tube-shaped steel strip 1 is in the excessive heat input state, generates display data for displaying this state, and outputs this to the display device 16. This display data includes the image data stored at step S2, data showing that the butting angle of the welded parts 5 of the tube-shaped steel strip 1 is abnormal, data showing the shape of the butting surfaces (welded parts 5) (V-shape or inverted V-shape), or data showing the butting angle (angle θ of FIG. 7). The display device 16 displays an image based on this display data. Further, the judgment result output part 38 outputs the data showing the butting angle (angle θ of FIG. 7) to the control device 17. The control device 17 controls the operation of the rolls etc. based on this data. Further, it ends the operation by the flow chart of FIG. 14.

On the other hand, when the region where the brightness of the B component is saturated is not only at a specific position, the routine proceeds to step S13. When the routine proceeds to step S13, the judgment result output part 38 judges that the welded parts 5 of the tube-shaped steel strip 1 are in the normal state, generates display data for displaying this state, and outputs this to the display device 16. This display data includes the image data stored at step S2 and data showing the welded parts 5 of the tube-shaped steel strip 1 is in the normal state. The display device 16 displays an image based on this display data. Further, it ends the operation by the flow chart of FIG. 14.

As explained above, in the flow chart shown, in FIG. 14, the "analyzing means" is realized by the performing the processing of steps S3 to S7, S9, and S11. Further, the "displaying means" is realized by performing the processing of steps S8, S10, S12, and S13.

Next, while referring to the flow chart of FIG. 15, an example of the operation of the data processing system 15 when analyzing scale at the welded parts 5 of the tube-shaped steel strip 1 will be explained.

First, at step S21, the image acquisition part 31 stands by until acquiring the image data of the welded parts 5 of the tube-shaped steel strip 1 from the CCD camera 11 and obtaining the positional data relating to the position of the tube-shaped steel strip 1 at that time from the encoder 19. Further, when these data are obtained, the routine proceeds to step S22.

When proceeding to step S22, the image acquisition part 31 links the image data and the positional data obtained at step S21 with each other and stores them in a storage medium.

Next, at step S23, the measurement area setting part 32 reads the image data stored at step S22. Further, the measurement area setting part 32 uses the read image data to insert lines 81 and 82 matched with the shapes of the inside ends of the tubeshaped steel strip 1 into the image of the welded parts 5 of the tube-shaped steel strip 1.

Next, at step S24, the measurement area setting part 32 detects the intersection 83 of the lines 81, 82 inserted at step S23 as the position of the inside ends of the butting surfaces (welded parts 5). Further, the measurement area setting part 32 sets a second measurement area 121 having the inside ends of the butting surfaces (intersection 83) as the center of the bottom end (see FIG. 12).

Next, at step S25, the differential image generation part 36 judges whether two "images of the welded parts 5 of the tube-shaped steel strip 1" consecutive in time have been obtained. When the result of this judgment is that two "images of the welded parts 5 of the tube-shaped steel strip 1" consecutive in time have not been obtained, the routine proceeds to step S21.

On the other hand, when two "images of the welded parts 5 of the tube-shaped steel strip 1" consecutive in time have been obtained, the routine proceeds to step S26. When the routine proceeds to step S26, the differential image generation part 36 generates a differential image of these two images.

Next, at step S27, the status judgment part 37 judges if a change in brightness of a threshold level or more has occurred in the second measurement area 121 based on the differential image generated at step S26. When the result of this judgment is that a change in brightness has occurred in the second measurement area 121, the routine proceeds to step S28.

When proceeding to step S28, the judgment result output part 38 judges that scale has entered the welded parts 5 of the tube-shaped steel strip, generates display data for displaying this state, and outputs this to the display device 16. This display data includes the data of the differential image generated at step S26, data showing that scale has entered the welded parts 5 of the tube-shaped steel strip 1, and data showing the position and size of the scale. The display device 16 displays an image based on this display data. Further, the judgment result output part 38 outputs the data showing the position and size of the scale to the control device 17. The control device 17 controls the operation of the rolls etc. based on this data. Further, it ends the operation by the flow chart of FIG. 15.

On the other hand, when the second measurement area 121 does not have any change in brightness, the routine proceeds to step S29. When the routine proceeds to step S29, the judgment result output part 38 judges that scale enters the welded parts 5 of the tube-shaped steel strip 1, generates display data for displaying this state, and outputs this to the display device 16. This display data includes data of the differential image generated at step S26 and data showing that scale is not entering the welded parts 5 of the tube-shaped steel strip 1. The display device 16 displays an image based on this display data. Further, it ends the operation by the flow chart of FIG. 15.

Figure 15:
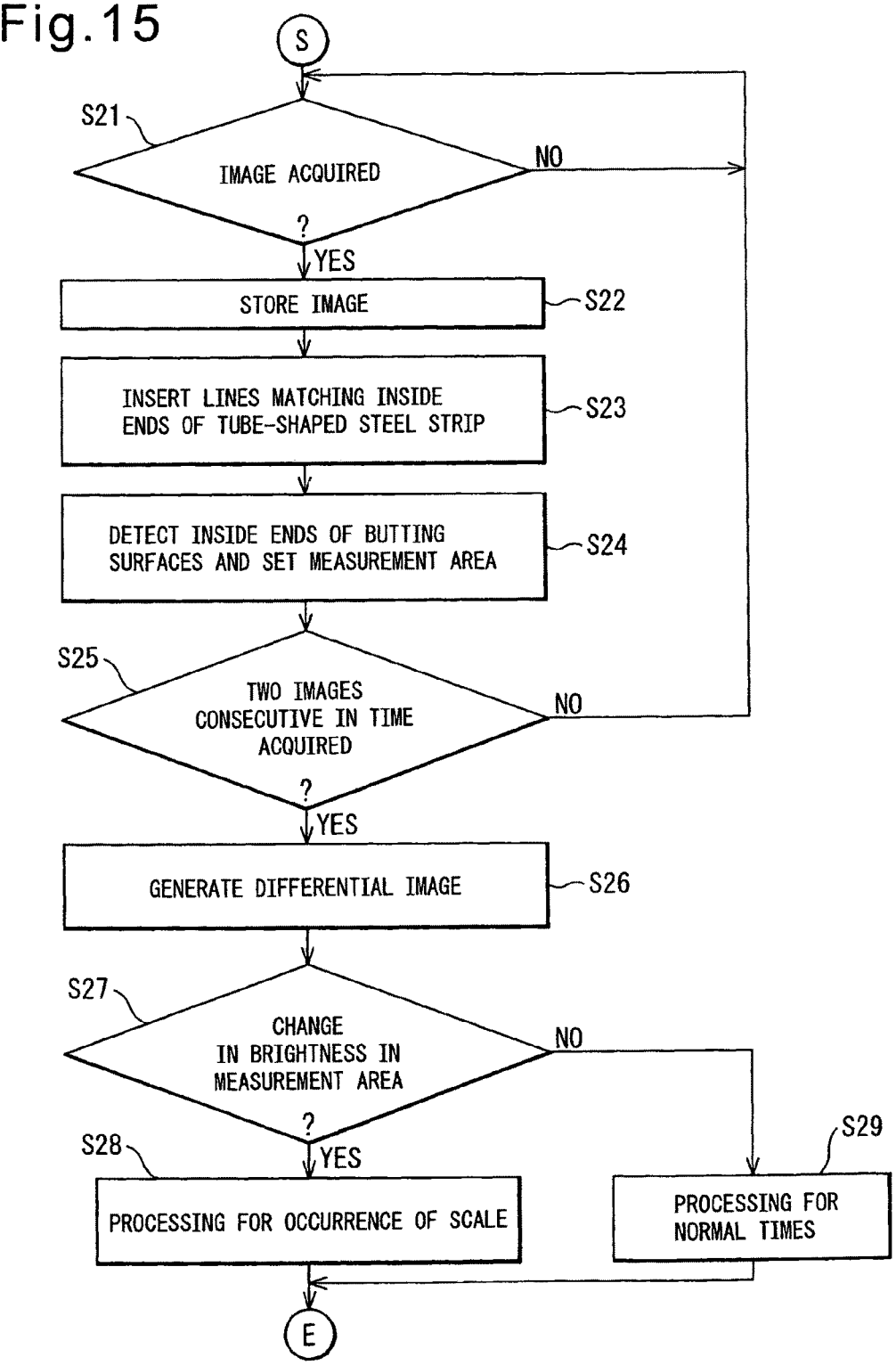
FIG. 15 is a flow chart showing a first embodiment of the present invention and explains an example of operation of a data processing system when analyzing scale at welded parts of a tube-shaped steel strip.

In the above way, the "analyzing means" is realized by performing the processing of step S23 to S27 in the flow chart shown in FIG. 15. Further, the "displaying means" is realized by the processing of steps S28 and 29.

In the above way, in the present embodiment, the container 21 formed by the non-conductor is provided inside it with a mirror 23 for observation of the welded parts 5 of the tube-shaped steel strip 1 from the side direction and relay lenses 24 for relaying the image reflected on the mirror 23 to the conversion lens 12. By configuring the container 21 by an insulated material in this way, it is possible to reduce the effects of electromagnetic noise occurring around the contact tips 3a, 3b received by the container 21 even if bringing the container 21 close to the welded parts 5 of the tube-shaped steel strip 1 (contact tips 3a, 3b) and possible to prevent the container 21 from being melted. Further, it is possible to insert the container 21 at a position closer to the welded parts 5 than the contact tips 3a, 3b, so it is possible to prevent the effects of the cooling water of the contact tips 3a, 3b from being felt and observe the welded parts 5 of the tube-shaped steel strip 1.

Further, the mirror 23 provided at the front end side inside the container 21 in this way receives the light emitted by the welded parts 5 of the tube-shaped steel strip 1 themselves through the heat resistant glass 22 from the side direction and reflects the image of the welded parts 5 of the tube-shaped steel strip 1 in the direction of the relay lens 24 provided at the base end side of the relay lens unit 13. The relay lenses 24 relay the image of the welded parts 5 of the tube-shaped steel strip 1 to the conversion lens 12, and the conversion lens 12 forms the image on the imaging area of the CCD camera 11. Therefore, the welded parts 5 of the tube-shaped steel strip 1 can be captured from the side direction by a resolution in accordance with the resolution of the CCD camera 11 and therefore information of the welded parts 5 of the tube-shaped steel strip 1 can be obtained more accurately than the past on-line. The light emitting part in the plate thickness direction of the butting surfaces has been measured as being about 0.1 mm. From sampling theory, to capture this, preferably a CCD camera resolution of 0.05 mm is necessary. On the other hand, if the brightness of the light emitted at this location is high and as a result the resolution of the CCD camera is 0.2 mm, it has been experimentally confirmed that the welding state can be discerned.

Further, by processing the "image data of the welded parts 5 of the tube-shaped steel strip 1" captured by the CCD camera 11 in this way, it is possible to accurately analyze the "heat input state and butting state" of the welded parts 5 of the tube-shaped steel strip 1 and the presence of any scale at the welded parts 5 of the tube-shaped steel strip 1 (if there is scale, its position and size) on-line more accurately than in the past. Further, by measuring the bead width of the butting parts from the captured image of the welded parts 5 of the tube-shaped steel strip 1, it is possible to easily judge the suitability of the ejection state of the molten part 5.

Further, by displaying the analyzed information, it is possible to monitor the quality of the electric-resistance-welded pipe on-line and, even without destructive testing of already produced electric-resistance-welded pipe, possible to set the roll operating conditions when changing the type of the strip-shaped steel plate.

Further, the inventors attached a spiral shaped metal air pipe 13b around the surface of the main body 13a of the relay lens unit 13 and ran low temperature air through the air pipe 13b so that the air would be discharged over the heat resistant glass 22. Therefore, it is possible to suppress the temperature rise of the main body 13a (container 21 etc.) of the relay lens unit 13 and suppress the deposition of scale etc. on the heat resistant glass 22.

Further, in the present embodiment, the case of performing processing using the data relating to the brightness of the image captured by a CCD camera 11 was used as an example for the explanation, but this is not necessarily required. For example, when using a CCD camera which has been calibrated for temperature (set in correspondence of temperature and brightness) in advance, data relating to the temperature of the welded parts 5 of the tube-shaped steel strip 1 (temperature information) is obtained from the CCD camera, so that data relating to temperature may also be used for processing. Further, the imaging device is not limited to a CCD camera and may also be, for example, a camera having a CMOS sensor.

Further, in the present embodiment, low temperature air is run through the spirally attached metal air pipe 13b, but this is not necessarily required. For example, it is also possible to run an inert gas or other gas through it. Further, it is also possible to supply water or another liquid to the air pipe 13b. Further, the air pipe 13b does not have to be spiral shaped. So long as attaching the air pipe so that the air from it is discharged over the heat resistant glass 22, the air pipe may also be straight. There is no particular need for a pipe to be provided either. For example, FIG. 21 shows an example of the structure of a relay lens unit 13 not using any pipe. The container 21 holding the relay lenses is made a two-wall structure and a clearance of several mm is provided between the inside container 21 and the outside container 21b to allow air to be run through it. The structure is sealed except at the air insertion port connected to a pump and the discharge port. Air is efficiently ejected on to the surface of the heat resistant glass 22. Further, to concentratedly cool the front end most liable to receive radiant heat from the steel material, it is also possible to insert spacers between the inside container 21 and outside container 21b to form pathways for guiding the air to the front end.

Further, in the present embodiment, the explanation was given with reference to the example of a configuration inserting the relay lens unit 13 vertically with respect to the axial direction of the tube-shaped steel strip 1, but the angle of insertion of the relay lens unit 13 is not limited to this. Further, in the present embodiment, the angle of attachment of the mirror 23 was fixed, but the angle of attachment of the mirror 23 may also be made adjustable. Further, both when fixing the angle of attachment of the mirror 23 and making it adjustable, the angle of attachment of the mirror 23 is determined in accordance with the angle of insertion of the relay lens unit 13, the size and position of the welded parts 5 being observed, etc.

Further, in the present embodiment, the explanation was given with reference to the example of performing processing using the R component and the B component, but this is not necessarily required. For example, when, with just processing using the R component and B component, the state of the welded parts 5 of the tube-shaped steel strip 1 cannot be reliably judged, it is also possible to use the G component as well for the processing and to analyze the state of the welded parts 5 of the tube-shaped steel strip 1 considering the results of this processing as well.

Further, in the present embodiment, the explanation was given with reference to the example of using the contact tips 3a, 3b to produce the electric-resistance-welded pipe. However, this not necessarily required. FIG. 16 are views showing another example of the configuration of an electric-resistance-welded pipe production line (electric-resistance-welded pipe production system). As shown in FIG. 16, in place of the contact tips 3a, 3b, it is also possible to use a work coil (induction. coil) 161.

(Second Embodiment)

Next, a second embodiment of the present invention will be explained. In the present embodiment, in addition to the configuration explained in the above first embodiment, image data obtained by capturing the welded parts 5 of the tube-shaped steel strip 1 from directly above them is also used to analyze the state of the welded parts 5 of the tube-shaped steel strip 1. In this way, the present embodiment adds to the above first embodiment the configuration for capturing an image of the welded parts 5 of the tube-shaped steel strip 1 from directly above them and processing it. Therefore, in the explanation of the present embodiment, parts the same as in the above first embodiment are assigned the same reference numerals as the reference numerals assigned to FIG. 1 to FIG. 16 and detailed explanations are omitted.

Figure 17:
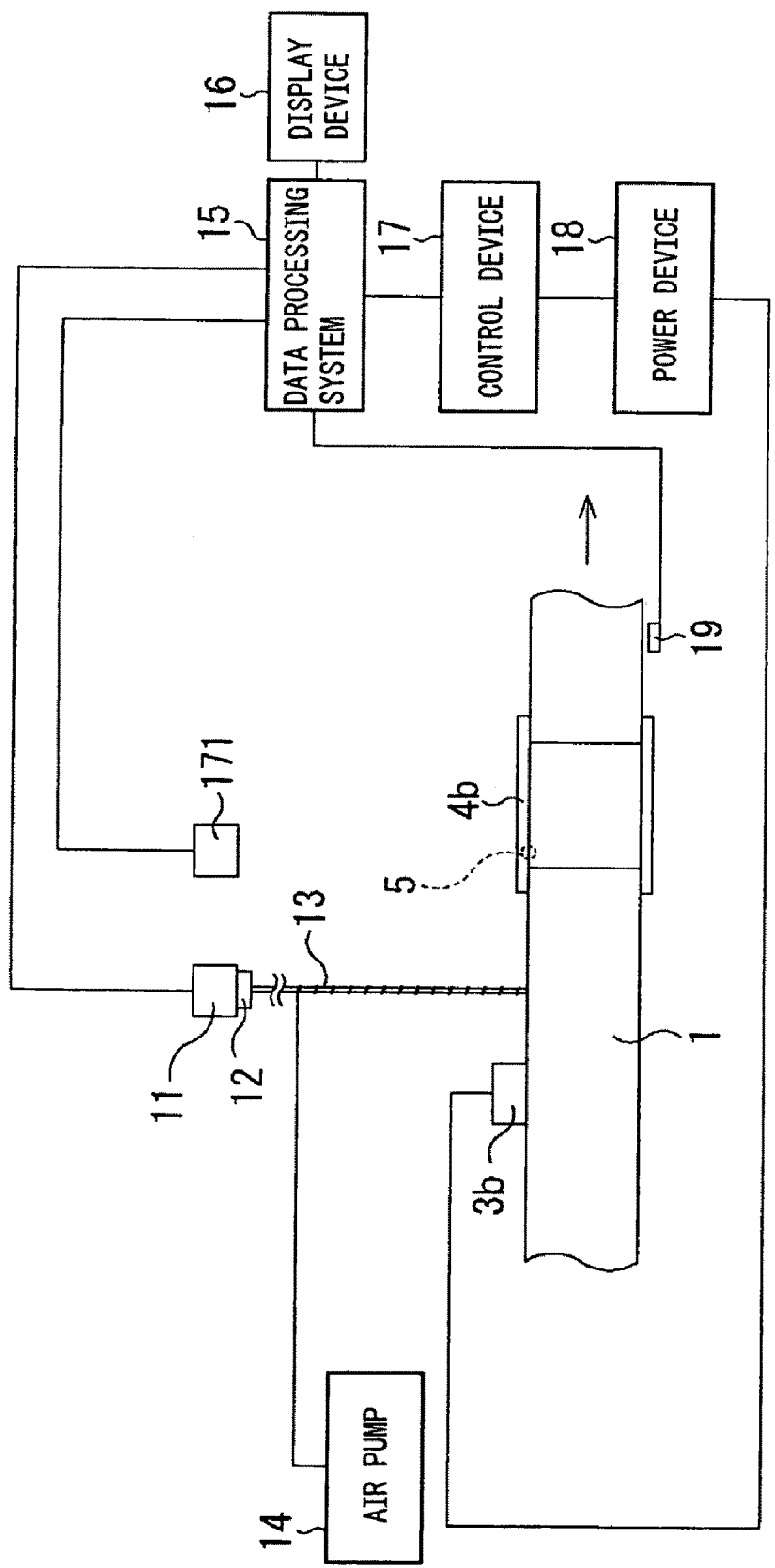
FIG. 17 is a view showing a second embodiment of the present invention and shows an example of the configuration of an electric-resistance-welded pipe production line (electric-resistance-welded pipe production system).
Figure 18:
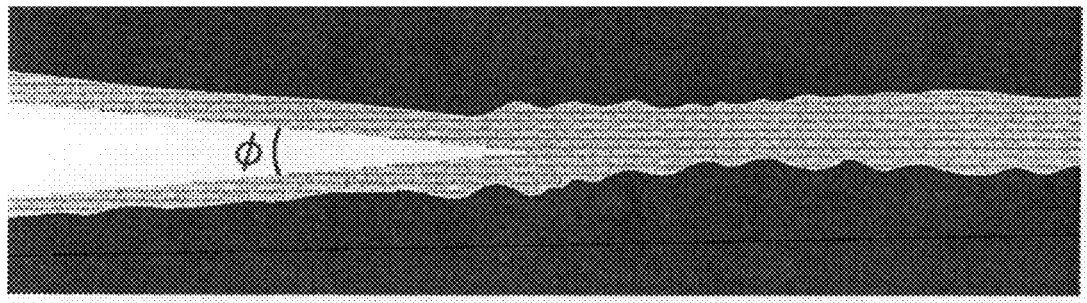
FIG. 18 is a view showing a second embodiment of the present invention and shows an example of an image taken by a CCD camera arranged directly above welded parts of a tube-shaped steel strip.

FIG. 17 is a view showing an example of the configuration of an electric-resistance-welded pipe production line (electric-resistance-welded pipe production system). In FIG. 17, a CCD camera 171 is arranged directly above the welded parts 5 of the tube-shaped steel strip 1 so that its imaging area directly faces the welded parts 5 of the tube-shaped steel strip 1. FIG. 18 is a view showing an example of an image captured by the CCD camera 171. As shown in FIG. 18, if capturing the welded parts 5 of the tube-shaped steel strip 1 from directly above them, information relating to the V-angle (angle Φ of FIG. 18, opening angle of tube-shaped steel strip 1 when viewed from right above it) can be obtained.

Therefore, the data processing system 15 can obtain information relating to the "heat input state and butting state" of the welded parts 5 of the tube-shaped steel strip 1 from the CCD camera 11 and can obtain information relating to the V-angle from the CCD camera 171. Further, the data processing system 15 of the present embodiment has a synchronization circuit for obtaining images from the CCD cameras 11, 171 captured at the same timings. By operation of this synchronization circuit, it is possible to obtain an "image seen from the side direction" and an "image seen from right above" of the welded parts 5 of the tube-shaped steel strip 1 at the same timing.

In this way, in the present embodiment, not only an image of the welded parts 5 of the tube-shaped steel strip 1 seen from the side direction, but also an image seen from the direction right above is obtained, so it is possible to obtain information on the welded parts 5 of the tube-shaped steel strip 1 much more accurately and possible to use the V-angle as an indicator for determining the content of control at the control device 17.

Further, in the present embodiment as well, it is possible to employ the various modifications explained in the above first embodiment.

(Third Embodiment)

Next, a third embodiment of the present invention will be explained. In the above first and second embodiments, the mirror 23 was provided inside the container 21 of the relay lens unit 13. As opposed to this, in the present embodiment, the explanation will be given of the case of forming the relay lens unit without providing a mirror 23. In this way, the present embodiment and the above first and second embodiments differ mainly in the part of the configuration of the relay lens unit. Therefore, in the explanation of the present embodiment, parts the same as the above first and second embodiments will be assigned the same reference numerals as the reference numerals assigned in FIG. 1 to FIG. 17 and detailed explanations will be omitted.

FIG. 19 is a view showing an example of the configuration of an electric-resistance-welded pipe production line (electric-resistance-welded pipe production system).

As shown in FIG. 19, in the present embodiment, the axial direction of the relay lens unit 191 is made substantially parallel to the direction in which the strip-shaped steel plate 1 advances (pipe axial direction of electric-resistance-welded pipe 6, direction of arrow in the figure) and the front end face of the relay lens unit 191 is made substantially facing the welded parts 5.

Figure 20:
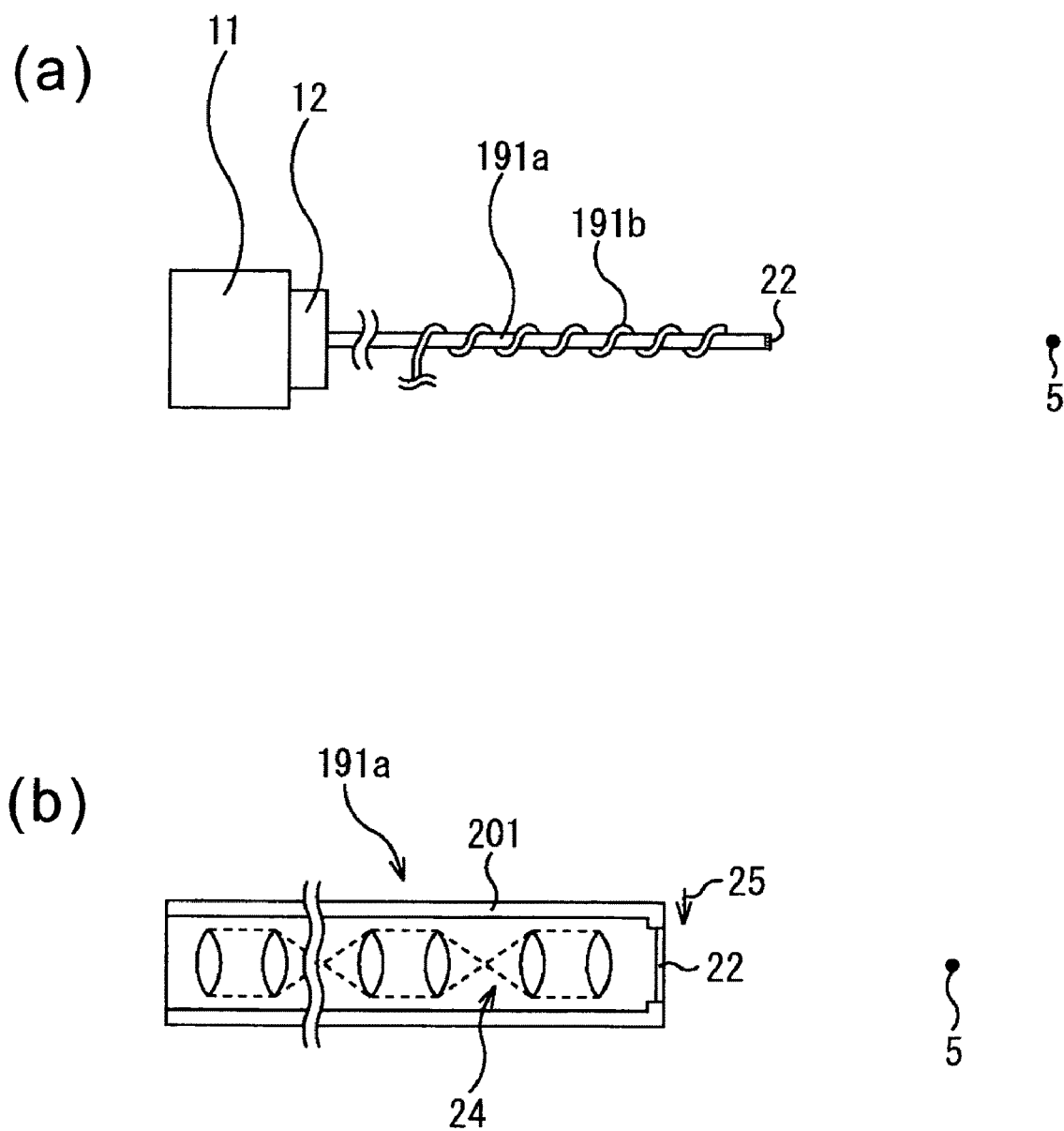
FIG. 20 are views showing a third embodiment of the present invention and show an example of the detailed configuration of a CCD camera, conversion lens, and relay lens unit.

FIG. 20 are views showing an example of the detailed configuration of the CCD camera 11, conversion lens 12, and relay lens unit 191.

In FIG. 20(a), the relay lens unit 191 has a main body 191a and an air pipe 191b. The main body 191a relays the "image of the welded parts 5 of the tube-shaped steel strip 1" obtained at its front end face (as it is in size (or enlarged)) to the conversion lens 12. On the other hand, the air pipe 191b is a pipe attached in a spiral to the surface of the main body 191a and made of an insulated material. Inside it, air supplied from an air pump 14 is run.

As shown in FIG. 20(b), the main body 191a of the relay lens unit 191 has a container 201, heat resistant glass 22, and relay lenses 24.

The container 201 is formed using a similar material to the container explained in the first embodiment. At the opening at the front end surface of the container 201, heat resistant glass 22 is attached.

The relay lenses 24 are provided inside the container 201 in the pipe axial direction of the container 201 and relay the "image of the welded parts 5 of the tube-shaped steel strip 1" passing through the heat resistant glass 22 to the conversion lens 12 attached to the base end of the container 201.

At the surface of the main body 191a, the air pipe 191b is attached in a spiral shape. Therefore, by running air of for example a lower temperature than ordinary temperature through the air pipe 191b, it is possible to suppress the temperature rise of the main body 191a. Further, as shown in FIG. 19(b), the air 25 from the air pipe 191b is discharged over the heat resistant glass 22, so scale etc. can be kept from depositing on the heat resistant glass 22.

In the above way, in the present embodiment, the "container" is realized by using the container 201, while the "pipe made of an insulated material" is realized by using the air pipe 191b.

Even if configured in the above way, effects equivalent to those of the first and second embodiment can be obtained. By adopting the present embodiment, there is no longer a need to provide a mirror, so the configuration of the relay lens unit 191 can be made simpler than the relay lens units 13 of the first and second embodiments.

Further, in the above-mentioned embodiments, if using heat resistant glass 22, it is possible to protect the inside of the containers 21, 201 and possible to prevent foreign matter (dirt, scale, etc.) from entering inside the containers 21, 201, so this is preferable, but it is not necessarily required to provide the heat resistant glass 22.

(Fourth Embodiment)

Below, a fourth embodiment of the present invention will be explained while referring to the drawings.

Figure 22:
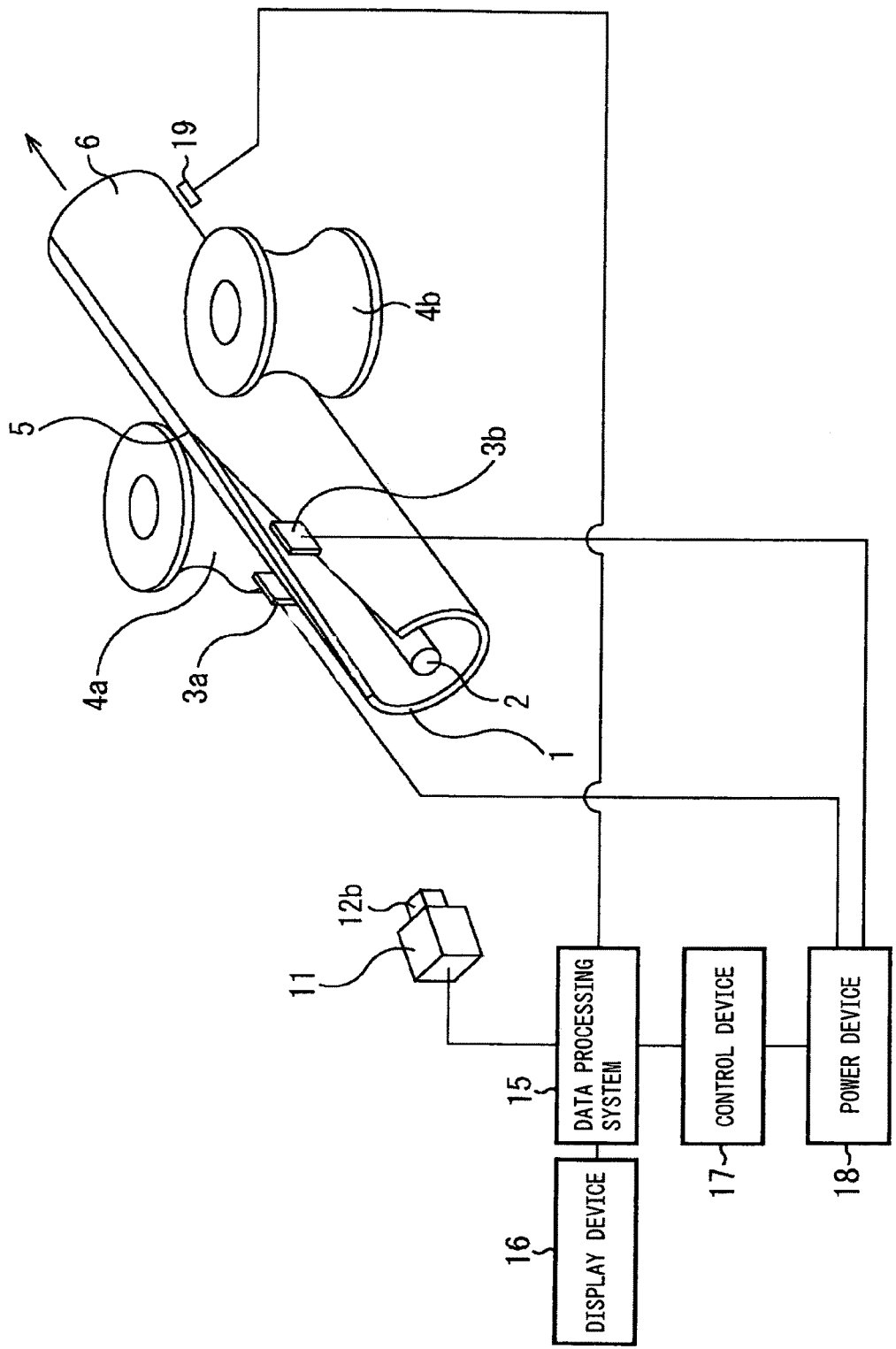
FIG. 22 is a view showing a fourth embodiment of the present invention and shows an example of the configuration of an electric-resistance-welded pipe production line (electric-resistance-welded pipe production system).

FIG. 22 is a view showing an example of the configuration of an electric-resistance-welded pipe production line (electric-resistance-welded pipe production system). In FIG. 22, the electric-resistance-welded pipe production line itself is a production line similar to that of the first embodiment shown in FIG. 1, but instead of the image means using relay lenses of the first to third embodiments, an imaging, means having a lens able to capture enlarged an image based on the light emitted from the welded parts (imaging lens 12b) and an imaging device converting that image to image data captured from the upstream side of the production line is shown.

In FIG. 22, the monitoring system (system for monitoring a state of production of electric-resistance-welded pipe) has a CCD camera 11, imaging lens 12b, data processing system 15, display device 16, control device 17, and power device 18.

Figure 23:
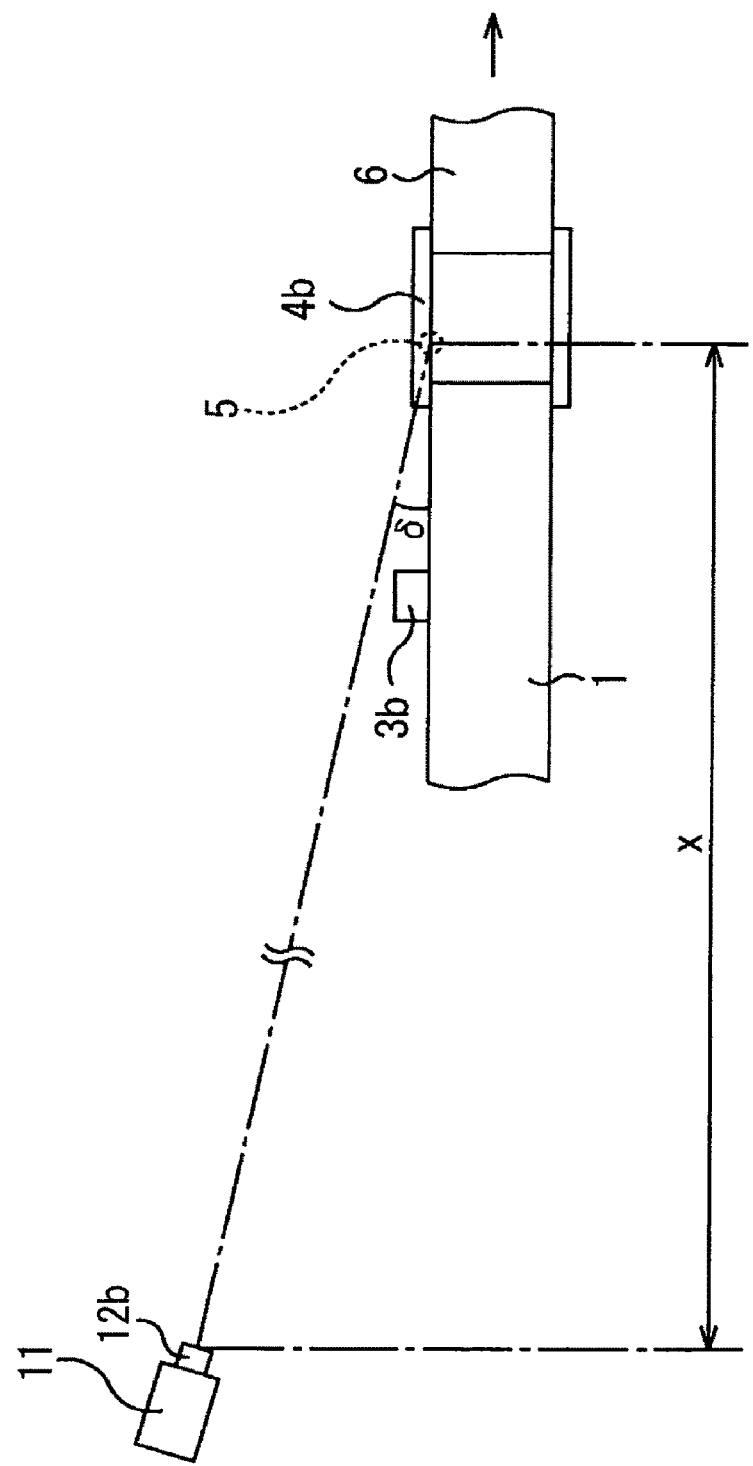
FIG. 23 is a view showing a fourth embodiment of the present invention and shows an example of the configuration of an electric-resistance-welded pipe production line (electric-resistance-welded pipe production system) from the horizontal direction.

FIG. 23 is a view of the electric-resistance-welded pipe production line (electric-resistance-welded pipe production system) shown in FIG. 22 seen from the horizontal direction. In FIG. 22 and FIG. 23, the CCD camera 11 is for example a ⅓ type image device having a XGA resolution. For example, if capturing an image of a rectangular region of a vertical 30 mm and horizontal 45 mm using a lens having a focal distance of 50 mm from a distance from the butting surfaces of 0.5 m, a resolution of about 0.05 mm is obtained. The light emitting part in the plate thickness direction of the butting surfaces has been measured as being about 0.1 mm. From sampling theory, to capture this, preferably a resolution of 0.05 mm is necessary. On the other hand, if the brightness of the light emitted at this location is high and as a result the resolution is 0.2 mm, it has been experimentally confirmed that the welding state can be discerned.

The imaging lens 12b is provided at a position able to receive light emitted from the welded parts 5 as a whole from the butting surfaces of the welded parts 5 (front) and enabling the welded parts 5 to be focused on. That is, the position of the imaging lens 12b is determined so that the lens surface of the imaging lens 12b and the welded parts 5 face each other and the imaging lens 12b is positioned separated from the welded parts 5 by exactly a distance in accordance with the focal distance. Specifically explained, the elevation angle δ from the center part of the welded parts 5 when viewing the optical axis direction of the imaging lens 12b becomes minus 20° to 20°, preferably minus 10° to 10°. This is because with electric seam welding, near the welded parts 5, the steel material starts to be heated from the ends, so the closer to the center of the plate thickness, the more the butting surfaces shift to the downstream side. These are angular conditions required for capturing the butting surfaces as a whole including the center of plate thickness. Further, the distance x in the horizontal direction between the welded parts 5 and the lens surface of the imaging lens 12b is preferably made at least 0.5 m to avoid electromagnetic noise. On the other hand, if capturing an image from a distance of over 2 m by a high magnification, there is also the problem of a difficulty in obtaining a depth of object field sufficient for covering variations in the welded parts 5, so preferably the image is captured from a distance of 0.5 m to 2 m.

Light passing through the imaging lens 12b having the above configuration enters the CCD camera 11 (CCD).

In the present embodiment, by using the CCD camera 11, the "imaging means" is realized, while by using the imaging lens 12b, the "lens" is realized. Further, in the present embodiment, the imaging lens 12b and the CCD camera 11 were made separate configurations, but an integrated unit of the CCD camera 11 and imaging lens 12b may also be used. Further, it is also possible not to use a magnifying lens (lens exclusively for magnification) as the imaging lens 12b, but for example to use a zoom lens (lens having functions of telescopic lens, targeting lens, and wide angle lens together).

The analyzing means and displaying means are the same as in the first embodiment, so its explanation will be omitted.

As explained above, in the present embodiment, the imaging lens 12b and the CCD camera 11 are arranged at the upstream side of the production line from the welded parts 5 so that the elevation angle δ becomes smaller (so that the angle becomes low) when viewing the optical axis direction of the imaging lens 12b from the center part of the welded parts 5. The imaging lens 12b has a lens for obtaining an enlarged image of the welded parts 5. The light emitted from the butting surfaces of the welded parts 5 is transmitted through the lens to the CCD camera 11. At this time, the imaging lens 12b is focused on the welded parts 5 by adjusting the distance between the welded parts 5 and the imaging lens 12b (distance x between the welded parts 5 and the imaging lens 12b in the horizontal direction and the elevation angle δ when viewing the imaging lens 12b from the center part of the welded parts 5) or the focal distance of the lens (power).

By configuring the system in this way, it is possible to capture an image of the butting surfaces of the welded parts 5 by a resolution in accordance with the resolution of the CCD camera 11. Accordingly, it is possible to obtain information of the welded parts 5 more accurately than in the past and on-line by a simple configuration without use of any special device.

Further, by processing the "image data of the welded parts 5 of the tube-shaped steel strip 1" captured by the CCD camera 11, it is possible to analyze the "heat input state and butting state" of the welded parts 5 of the tube-shaped steel strip 1 and the presence of scale at the welded parts 5 of the tube-shaped steel strip 1 (in the case where there is scale, its positions and size) on-line more accurately than in the past. Further, by measuring the bead width of the butting parts from the captured image of the welded parts 5 of the tube-shaped steel strip 1, it is also possible to judge the suitability of the ejected state of the welded parts 5.

Further, by displaying the analyzed information, it is possible to monitor the quality of the electric-resistance-welded pipe on-line and, even without destructive testing of already produced electric-resistance-welded pipe, possible to set the roll operating conditions when changing the type of the strip-shaped steel plate.

Further, in the same way as the first embodiment, in the present embodiment as well, performing processing using data relating to the brightness of the image captured by the CCD camera 11 is not necessarily required. For example, in the same way as the first embodiment, it is also possible to use data relating to the temperature so as to process the melting temperature. Further, the temperature may be calibrated by the data processing system 15, while the imaging device may be a camera having a CMOS sensor.

Further, in the present embodiment, the CCD camera 11 and imaging lens 12b were arranged above the welded parts 5, but the CCD camera 11 and imaging lens 12b may also be arranged at the same height as the welded parts 5 or below the welded parts 5. When arranging the CCD camera 11 and imaging lens 12b at the same height as the welded parts 5, the elevation angle $\delta$ when viewing the imaging lens 12b from the center part of the welded parts 5 becomes 0°. Further, when arranging the CCD camera 11 and imaging lens 12b below the welded parts 5, the elevation angle $\delta$ becomes a minus value. In this case, the result becomes the same as when using the depression angle when viewing the imaging lens 12b from the center part of the welded parts 5 to specify the positions of the CCD camera 11 and imaging lens 12b.

Further, in the present embodiment, the case of processing using the R component and the B component was explained as an example, but this is not necessarily required. For example, when it is not possible to reliably judge the state of the welded parts 5 of the tube-shaped steel strip 1 by just processing using the R component and the B component, it is also possible to perform processing using the G component as well and consider the results of this processing to analyze the state of the welded parts 5 of the tube-shaped steel strip 1.

Further, in the present embodiment, the case of using the contact tips 3a, 3b to produce the electric-resistance-welded pipe was explained as an example. However, this is not necessarily required. FIG. 24 is a view showing another example of the configuration of an electric-resistance-welded pipe production line (electric-resistance-welded pipe production system). As shown in FIG. 24, instead of the contact tips 3a, 3b, a work coil (induction coil) 161 may also be used.

(Fifth Embodiment)

Next, a fifth embodiment of the present invention will be explained. In the present embodiment, in addition to the configuration explained in the above fourth embodiment, image data obtained by capturing the welded parts 5 of the tube-shaped steel strip 1 from directly above them is also used to analyze the state of the welded parts 5 of the tube-shaped steel strip 1. In this way, the present embodiment adds to the above fourth embodiment the configuration of capturing the welded parts 5 of the tube-shaped steel strip 1 from right above them for processing. Therefore, in the explanation of the present embodiment, parts the same as in the above fourth embodiment are assigned the same reference numerals as the reference numerals assigned to FIG. 22 to FIG. 24 and detailed explanations are omitted.

FIG. 25 is a view showing an example of the configuration of an electric-resistance-welded pipe production line (electric-resistance-welded pipe production system). In FIG. 25, a CCD camera 171 is arranged with its imaging area right above the welded parts 5 of the tube-shaped steel strip 1. FIG. 18 shows an example of the image captured by the CCD camera 171. As shown in FIG. 18, if capturing the welded parts 5 of the tube-shaped steel strip 1 from directly above them, it is possible to obtain information relating to the V-angle (angle $\Phi$ in FIG. 18, opening angle of tube-shaped steel strip 1 when seen from right above it).

Therefore, the data processing system 15 can obtain information relating to the "heat input state and butting state" of the welded parts 5 of the tube-shaped steel strip 1 from the CCD camera 11 and can obtain information relating to the V-angle from the CCD camera 171. Further, the data processing system 15 of the present embodiment has a synchronization circuit for obtaining images captured by the CCD cameras 11 and 171 at the same timing. Due to the operation of this synchronization circuit, it is possible to obtain an "image as seen from the side direction" and an "image seen from right above" of the welded parts 5 of the tube-shaped steel strip 1 at the same timing.

In this way, in the present embodiment, not only an image of the welded parts 5 of the tube-shaped steel strip 1 as seen from their butting surfaces, but also an image seen from directly above are obtained, so information of the welded parts 5 of the tube-shaped steel strip 1 can-be obtained much more accurately. Further, the V-angle can be used as an indicator for determining the content of the control in the control device 17.

Further, in the present embodiment as well, the various modifications explained in the above fourth embodiment can be employed.

The embodiments of the present invention embodiment explained above can be realized by a computer running a program. Further, means for supplying the program to a computer, for example a CD-ROM or other computer readable storage medium storing the program or a transfer medium transferring the program can also be made embodiments of the present invention. Further, a computer readable storage medium or other program product storing the program can also be made embodiments of the present invention. The above program, computer readable storage medium, transfer medium, and program product are included in the scope of the present invention.

Further, the above embodiments all only show examples of working the present invention. The technical scope of the present invention should not be construed limitatively based on the same. That is, the present invention can be worked in various ways without departing from its technical idea and its main features.

Industrial Applicability

As explained above, according to the present invention, it is possible to capture high definition light emitted from the welded parts of steel plate formed in a tube shape for producing electric-resistance-welded pipe and possible to convert this to image data for analysis and display. Due to this, high precision analysis and easily understandable display by image processing or data processing become possible. These high precision analysis results and easily understandable display enable high precision, high response control, contribute to stable quality and improved productivity, and also remarkably improve the work efficiency by the operator and monitoring ability, so the inventors are confident that the invention contributes to striking developments in the process for production of electric-resistance-welded pipe.

List of References 1 tube-shaped steel strip
2 impeder
3a,b contact tips
4a,b squeeze rolls
5 welded parts
6 electric-resistance-welded pipe
11 CCD camera
12 conversion lens
12b imaging lens
13 relay lens unit
13a main body
13b air pipe
14 air pump
15 data processing system
16 the display device
17 the control device
18 power device
19 encoder
21 container
21b outside container
22 heat resistant glass
23 mirror
24 relay lenses
25 air
161 work coil
171 CCD camera
191 relay lens unit
191a main body
191b air pipe
201 container
201b outside container

The invention claimed is:

1. A system for monitoring a state of production of electric-resistance-welded pipe which monitors a state of welded parts on-line when forming a steel plate into a tube shape and welding two ends of the steel plate to produce electric-resistance-welded pipe,
said system for monitoring a state of production of electric-resistance-welded pipe characterized by having
an imaging means for obtaining an image from light emitted from butting surfaces of said steel plate at said welded parts from an upstream side of said welding process,
an analyzing means for analyzing a state of the steel plate at said welded parts in a first measurement area and a second measurement area in a plate thickness direction based on image data obtained by said imaging means,
wherein the first measurement area has a longitudinal direction length corresponding to a thickness of the steel plate and a horizontal direction length, said first measurement area is set to have the inside ends of the butting surfaces as the center of the lower end of the first measurement area;
and wherein the second measurement area encompasses the first measurement area and has at least a horizontal direction length that is greater than the horizontal direction length of the first measurement area, and
a displaying means for displaying results of analysis by said analyzing means on a display device.

2. A system for monitoring a state of production of electric-resistance-welded pipe as set forth in claim 1 characterized in that said imaging means has relay lenses for relaying an image based on light emitted from said welded parts, a container containing said relay lenses and made at least in part by an insulated material, and an imaging device obtaining the image relayed by said relay lenses and converting it to image data.

3. A system for monitoring a state of production of electric-resistance-welded pipe as set forth in claim 2 characterized by having inside said container a mirror reflecting the image based on the light emitted from said welded parts and relaying the image reflected by said mirror by said relay lenses.

4. A system for monitoring a state of production of electric-resistance-welded pipe as set forth in claim 2 or 3 characterized by having in said container a transparent material allowing the light emitted from said welded parts to pass to the inside of said container.

5. A system for monitoring a state of production of electric-resistance-welded pipe as set forth in claim 2 or 3 characterized by attaching to the surface of said container a pipe made from an insulated material and having a supplying means for supplying a gas or liquid inside said pipe.

6. A system for monitoring a state of production of electric-resistance-welded pipe as set forth in claim 5 characterized in that the gas or liquid supplied inside said pipe is discharged over a transparent material attached to said container allowing the light emitted from said welded parts to pass to the inside of said container.

7. A system for monitoring a state of production of electric-resistance-welded pipe as set forth in claim 2 or 3 characterized by having at the outside of said container a second container arranged parallel to said container across a space and made of an insulated material and having a supplying means for supplying a gas or liquid between said container and said second container.

8. A system for monitoring a state of production of electric-resistance-welded pipe as set forth in claim 7 characterized in that the gas or liquid supplied inside said second container is discharged over a transparent material attached to said second container allowing the light emitted at said welded parts to pass to the inside of said second container.

9. A system for monitoring a state of production of electric-resistance-welded pipe as set forth in claim 1 characterized in that said imaging means has a lens for enabling an image based on light emitted from said welded parts to be obtained enlarged and an imaging device obtaining said image from an upstream side of the production line and converting it to image data.

10. A system for monitoring a state of production of electric-resistance-welded pipe as set forth in claim 9 characterized in that said lens is provided at a position enabling it to receive light emitted from different positions of the butting surfaces of said welded parts in the plate thickness direction and enabling said lens to be focused at said welded parts.

11. A system for monitoring a state of production of electric-resistance-welded pipe as set forth in claim 10 characterized in that said lens is provided at a position wherein an elevation angle when viewing an optical axis direction of said lens from a certain part of said welded parts are minus 20° to 20°.

12. A system for monitoring a state of production of electric-resistance-welded pipe as set forth in claim 9 characterized in that said lens is provided at a position of 0.5 to 2.0 m apart from the butting surfaces in an upstream side of the production line.

13. A system for monitoring a state of production of electric-resistance-welded pipe as set forth in claim 1, 2, 3 or 9 characterized in that said imaging means has an imaging resolution of 0.2 mm or less.

14. A system for monitoring a state of production of electric-resistance-welded pipe as set forth in claim 1, 2, 3 or 9 characterized in that said analyzing means finds brightness information or temperature information of the steel plate in the first measurement area at said welded parts in the plate thickness direction based on the image data obtained by said imaging means and uses the found brightness information or temperature information to analyze a molten state of the steel plate and a butting state of the steel plate at said welded parts.

15. A system for monitoring a state of production of electric-resistance-welded pipe as set forth in claim 14 characterized in that said analyzing means has a first judging means for comparing brightness information or temperature information of the steel plate at said welded parts in the plate thickness direction and a preset first and second threshold value and analyzing whether said welded parts are in a low heat input state or not when said brightness information or temperature information is at the first threshold value or below and a second judging means for judging that said welded parts are in an excessive heat input state when said brightness information or temperature information is the second threshold value or more.

16. A system for monitoring a state of production of electric-resistance-welded pipe as set forth in claim 14 characterized by having a third judging means for judging that an butting angle of said welded parts is abnormal when a saturation region of said brightness information or temperature information is in a predetermined range.

17. A system for monitoring a state of production of electric-resistance-welded pipe as set forth in claim 14 characterized in that said analyzing means finds the maximum brightness or temperature for each line in the first measurement area as first order brightness information or temperature information and uses the found first order brightness information or temperature information to analyze a molten state of the steel plate and an butting state of the steel plate at said welded parts.

18. A method for monitoring a state of production of electric-resistance-welded pipe using a system for monitoring a state of production of electric-resistance-welded pipe as set forth in claim 17, which monitors the state of welded parts on-line when forming the steel plate into a tube shape and heating the two ends of said steel plate for producing electric-resistance-welded pipe,
said method for monitoring the state of production of electric-resistance-welded pipe characterized by having
an imaging step of obtaining light emitted from said welded parts and converting that to image data,
an analyzing step of analyzing a state of the steel plate at said welded part in the plate thickness direction based on said image data, and
a displaying step of displaying the results of analysis on a display device.

19. A system for monitoring a state of production of electric-resistance-welded pipe as set forth in claim 1, 2, 3 or 9 characterized in that said analyzing means compares brightness information or temperature information in the second measurement area based on a plurality of image data obtained by said imaging means at different times and analyzes the state of oxides at said welded parts.

20. A system for monitoring a state of production of electric-resistance-welded pipe as set forth in claim 19 characterized in that said analyzing means has a differential image generating means for generating differential data of two image data obtained by said imaging means at different times and a change judging means for judging if said welded parts have had a preset threshold value or more of brightness change or temperature change based on differential data generated by said differential image generating means and judges that said welded parts have oxides when said change judging means judges that said welded parts have had said threshold value or more of brightness change or temperature change and judges that said welded parts have no oxides when said change judging means judges that said welded parts have no threshold value or more of brightness change or temperature change.

21. A method for monitoring a state of production of electric-resistance-welded pipe using a system for monitoring a state of production of electric-resistance-welded pipe as set forth in any one of claims 1 to 3, 9 to 11 and 12, which monitors the state of welded parts on-line when forming the steel plate into a tube shape and heating the two ends of said steel plate for producing electric-resistance-welded pipe,
said method for monitoring the state of production of electric-resistance-welded pipe characterized by having
an imaging step of obtaining light emitted from said welded parts and converting that to image data,
an analyzing step of analyzing a state of the steel plate at said welded part in the plate thickness direction based on said image data, and
a displaying step of displaying the results of analysis on a display device.

22. A method for monitoring the state of production of electric-resistance-welded pipe as set forth in claim 21 characterized in that said analyzing step finds brightness information or temperature information of the steel plate at said welded parts in the plate thickness direction based on said image data and uses the found brightness information or temperature information to analyze a molten state of the steel plate and welding material and an butting state of the steel plate at said welded parts.

23. A method for monitoring the state of production of electric-resistance-welded pipe as set forth in claim 22 characterized in that said analyzing step has a first judging step of comparing brightness information or temperature information of the steel plate at said welded parts in the plate thickness direction and a preset first and second threshold value and analyzing whether said welded parts are in a low heat input state or not when said brightness information or temperature information is at the first threshold value or below and a second judging step of judging that said welded parts are in an excessive heat input state when said brightness information or temperature information is the second threshold value or more.

24. A method for monitoring the state of production of electric-resistance-welded pipe as set forth in claim 23 characterized by having a third judging step judging that an butting angle of said welded parts is abnormal when a saturation region of said brightness information or temperature information is in a predetermined range.

25. A method for monitoring the state of production of electric-resistance-welded pipe as set forth in claim 22 characterized by having a third judging step judging that an butting angle of said welded parts is abnormal when a saturation region of said brightness information or temperature information is in a predetermined range.

26. A method for monitoring the state of production of electric-resistance-welded pipe as set forth in claim 21 wherein said analyzing step compares the brightness information or temperature information based on a plurality of said image data obtained at different imaging times and analyzes the state of oxides at said welded parts.

27. A method for monitoring the state of production of electric-resistance-welded pipe as set forth in claim 26 characterized in that said analyzing step has a differential image generating step of generating differential data of two image data obtained by said imaging means at different times and a change judging step of judging if said welded parts have had a preset threshold value or more of brightness change or temperature change based on differential data generated by said differential image generating step and judges that said welded parts have oxides when said change judging step judges that said welded parts have had said threshold value or more of brightness change or temperature change and judges that said welded parts have no oxides when said change judging step judges that said welded parts have no threshold value or more of brightness change or temperature change.

28. A system for monitoring a state of production of electric-resistance-welded pipe as set forth in claim 21 characterized in that said imaging means has an imaging resolution of 0.2 mm or less.

29. A system for monitoring a state of production of electric-resistance-welded pipe as set forth in claim 21 characterized in that said analyzing means finds brightness information or temperature information of the steel plate in the first measurement area at said welded parts in the plate thickness direction based on the image data obtained by said imaging means and uses the found brightness information or temperature information to analyze a molten state of the steel plate and a butting state of the steel plate at said welded parts.

30. A system for monitoring a state of production of electric-resistance-welded pipe as set forth in claim 21 characterized in that said analyzing means compares brightness information or temperature information in the second measurement area based on a plurality of image data obtained by said imaging means at different times and analyzes the state of oxides at said welded parts.

* * * * *